US012373915B2

United States Patent
Amirghodsi et al.

(10) Patent No.: US 12,373,915 B2
(45) Date of Patent: *Jul. 29, 2025

(54) GENERATING MODIFIED DIGITAL IMAGES UTILIZING NEAREST NEIGHBOR FIELDS FROM PATCH MATCHING OPERATIONS OF ALTERNATE DIGITAL IMAGES

(71) Applicant: Adobe Inc., San Jose, CA (US)

(72) Inventors: Sohrab Amirghodsi, Seattle, WA (US); Aliakbar Darabi, New Castle, WA (US); Elya Shechtman, Seattle, WA (US)

(73) Assignee: Adobe Inc., San Jose, CA (US)

( * ) Notice: Subject to any disclaimer, the term of this patent is extended or adjusted under 35 U.S.C. 154(b) by 484 days.

This patent is subject to a terminal disclaimer.

(21) Appl. No.: 17/820,649

(22) Filed: Aug. 18, 2022

(65) Prior Publication Data

US 2022/0398712 A1   Dec. 15, 2022

Related U.S. Application Data

(63) Continuation of application No. 16/678,132, filed on Nov. 8, 2019, now Pat. No. 11,449,974.

(51) Int. Cl.
*G06T 7/00* (2017.01)
*G06T 3/4038* (2024.01)
(Continued)

(52) U.S. Cl.
CPC .......... *G06T 3/4038* (2013.01); *G06T 7/0002* (2013.01); *G06T 9/00* (2013.01);
(Continued)

(58) Field of Classification Search
CPC .......... G06K 9/00442; G06K 9/00993; G06K 9/033; G06K 9/18; G06K 9/34;
(Continued)

(56) References Cited

U.S. PATENT DOCUMENTS 6,222,947 B1    4/2001   Koba
8,290,253 B1   10/2012   Wang et al.
(Continued)

FOREIGN PATENT DOCUMENTS

CN   106023089 A   10/2016
EP     2209090 A1    7/2010

OTHER PUBLICATIONS

U.S. Appl. No. 17/332,773, Jul. 12, 2023, Notice of Allowance.
(Continued)

*Primary Examiner* — Duy M Dang
(74) *Attorney, Agent, or Firm* — Keller Preece PLLC

(57) ABSTRACT

The present disclosure relates to systems, methods, and non-transitory computer readable media for generating modified digital images by utilizing a patch match algorithm to generate nearest neighbor fields for a second digital image based on a nearest neighbor field associated with a first digital image. For example, the disclosed systems can identify a nearest neighbor field associated with a first digital image of a first resolution. Based on the nearest neighbor field of the first digital image, the disclosed systems can utilize a patch match algorithm to generate a nearest neighbor field for a second digital image of a second resolution larger than the first resolution. The disclosed systems can further generate a modified digital image by filling a target region of the second digital image utilizing the generated nearest neighbor field.

20 Claims, 11 Drawing Sheets

(51) Int. Cl.
 *G06T 9/00* (2006.01)
 *G06V 10/75* (2022.01)
(52) U.S. Cl.
 CPC .. *G06V 10/751* (2022.01); *G06T 2207/20016* (2013.01); *G06T 2207/20221* (2013.01)
(58) Field of Classification Search
 CPC .. G06K 9/6202; G06F 17/243; G06Q 10/087; G06Q 10/10; G06T 7/0002; G06T 2207/20221; G06T 2207/20016; G06T 2200/32; G06T 7/337; G06T 9/00; G06T 3/4038; G06T 3/4053
 See application file for complete search history.

(56) References Cited

U.S. PATENT DOCUMENTS

| | | | |
|---|---|---|---|
| 8,737,737 | B1 | 5/2014 | Feldman et al. |
| 9,554,133 | B2 | 1/2017 | Ye et al. |
| 9,710,898 | B2 | 7/2017 | Amirghodsi et al. |
| 11,449,974 | B2 * | 9/2022 | Amirghodsi ......... G06T 3/4038 |
| 2008/0152225 | A1 | 6/2008 | Iwamoto |
| 2010/0104158 | A1 | 4/2010 | Shechtman et al. |
| 2010/0111370 | A1 | 5/2010 | Black et al. |
| 2012/0088981 | A1 | 4/2012 | Liu et al. |
| 2012/0155766 | A1 | 6/2012 | Zhang et al. |
| 2012/0230591 | A1 | 9/2012 | Shibata |
| 2013/0121417 | A1 | 5/2013 | Chong et al. |
| 2013/0163874 | A1 | 6/2013 | Shechtman et al. |
| 2014/0161362 | A1 | 6/2014 | Cao et al. |
| 2014/0205186 | A1 | 7/2014 | Cao et al. |
| 2015/0071545 | A1 | 3/2015 | Yang et al. |
| 2015/0178943 | A1 | 6/2015 | Li et al. |
| 2016/0042516 | A1 | 2/2016 | Tieu et al. |
| 2016/0100191 | A1 | 4/2016 | Mishra et al. |
| 2017/0039723 | A1 | 2/2017 | Price et al. |
| 2018/0121754 | A1 | 5/2018 | Carr et al. |
| 2019/0042875 | A1 | 2/2019 | Carr et al. |

OTHER PUBLICATIONS

U.S. Appl. No. 17/332,773, Mar. 1, 2023, Office Action.
Barnes, C., Shechtman, E., Finkelstein, A., and Goldman, D. B. Aug. 2009. Patchmatch: A randomized correspondence algorithm for structural image editing. In ACM SIGGRAPH 2009 Papers, ACM, New York, NY, USA, Siggraph '09, 24:1-24:11.
Barnes, C., Shechtman, E., Goldman, D. B., and Finkelstein, A. Sep. 2010. The generalized PatchMatch correspondence algorithm. In European Conference on Computer Vision.
Barnes, C., Zhang, F.-L., Lou, L., Wu, X., and Hu, S.-M. Aug. 2015. Patchtable: Effcient patch queries for large datasets and applications. In ACM Transactions on Graphics (Proc. SIGGRAPH).
Chandrashekhar, B. N., et al. "Implementation of Image Inpainting using OpenCV and CUDA on CPU-GPU Environment.", 2018 (Year: 2018).
Liu, Siying, et al. "PatchMatch-based automatic lattice detection for near-regular textures." Proceedings of the IEEE International Conference on Computer Vision. 2015.
Li, Yu, et al. "Spm-bp: Sped-up patchmatch belief propagation for continuous mrfs." Proceedings of the IEEE International Conference on Computer Vision. 2015.
Lefebvre, Sylvain, arid Hugues Hoppe. "Parallel controllable texture synthesis." ACM SIGGRAPH 2005 Papers. 2005. 777-786. (Year: 2005).
Muller, Oliver, Michael Ying Yang, and Bodo Rosenhahn. "Slice sampling particle belief propagation." Proceedings of the IEEE International Conference on Computer Vision. 2013.
Search Report as received in GB 1711706.0 dated Jan. 15, 2018.
U.S. Appl. No. 15/342,793, Jul. 3, 2018, Notice of Allowance.
U.S. Appl. No. 15/342,793, Jan. 11, 2019, Office Action.
U.S. Appl. No. 15/342,793, Sep. 16, 2019, Notice of Allowance.
U.S. Appl. No. 16/148,166, Jan. 11, 2019, Office Action.
U.S. Appl. No. 16/148,166, Sep. 11, 2019, Notice of Allowance.
U.S. Appl. No. 15/906,783, Dec. 13, 2019, Office Action.
U.S. Appl. No. 15/906,783, May 1, 2020, Office Action.
U.S. Appl. No. 15/906,783, Oct. 8, 2020, Office Action.
U.S. Appl. No. 15/906,783, Feb. 16, 2021, Notice of Allowance.
U.S. Appl. No. 16/363,839, Apr. 22, 2020, Notice of Allowance.
U.S. Appl. No. 16/678,132, Sep. 2, 2021, Preinterview 1st Office Action.
U.S. Appl. No. 16/678,132, Dec. 8, 2021, 1st Action Office Action.
U.S. Appl. No. 16/678,132, Mar. 14, 2022, Office Action.
U.S. Appl. No. 16/678,132, May 17, 2022, Notice of Allowance.
U.S. Appl. No. 16/985,927, Mar. 15, 2022, Preinterview 1st Office Action.
U.S. Appl. No. 16/985,927, May 5, 2022, 1st Action Office Action.
U.S. Appl. No. 16/985,927, Jul. 20, 2022, Office Action.
U.S. Appl. No. 16/985,927, Sep. 21, 2022, Notice of Allowance.
Xiao, Chunxia & Liu, Meng & Nie, Yongwei & Dong, Zhao. (2011). Fast Exact Nearest Patch Matching for Patch-Based Image Editing and Processing. IEEE transactions on visualization and computer graphics. 17. 1122-34. 10.1109/TVCG.2010.226.
Qi, Pan. (2014). Single-Frame Image Super-resolution Based on In-Place Patch Match Model. 91-94. 10.1109/ICDH.2014.25.
Notice of Grant as received in Chinese application 201710576025.X dated Oct. 19, 2022 [no English translation available].

* cited by examiner

GENERATING MODIFIED DIGITAL IMAGES UTILIZING NEAREST NEIGHBOR FIELDS FROM PATCH MATCHING OPERATIONS OF ALTERNATE DIGITAL IMAGES

CROSS-REFERENCE TO RELATED APPLICATIONS

The present application is a continuation of U.S. application Ser. No. 16/678,132, filed on Nov. 8, 2019. The aforementioned application is hereby incorporated by reference in its entirety.

BACKGROUND

Advancements in computing devices and digital image editing technology have led to a variety of innovations in providing tools for managing and editing digital images. For example, digital image editing systems are now able to analyze a digital image to identify patches of pixels that match other patches within the digital image. Based on this analysis, modern digital image editing systems are also able to modify the digital image by filling a particular target region of the digital image based on the identified matching patches to remove artifacts or resolve defects. Some systems are also capable of creating panoramic digital images by stitching multiple digital images together.

Despite these advances however, conventional digital image editing systems continue to suffer from a number of disadvantages in efficiency and flexibility. For example, conventional digital image editing systems require excessive processing power, memory, and computing time to identify and implement patch matches, such as for filling regions of stitched panoramic digital images. In particular, processing pixels (or groups of pixels) within a target region to identify matching pixels (or groups of pixels) is computationally expensive, and analyzing panoramic digital images made up of multiple high-resolution images compounds the expense. Conventional systems often analyze a digital image a number of times at various scales to generate digital image patches of matching pixels, which can be especially taxing when dealing with the numbers of pixels in high-resolution panoramas.

Additionally, conventional digital image editing systems are inflexible. For example, as just discussed, conventional systems often generate digital image patches in a rigid, siloed fashion, which can result in duplicative operations. For example, conventional systems often serially apply patch matching operations. The inefficiencies of conventional systems are only exacerbated by this rigidity, where patch matching operations are applied multiple times to different digital image versions or channels.

Thus, there are several disadvantages with regard to conventional digital image editing systems.

SUMMARY

One or more embodiments described herein provide benefits and solve one or more of the foregoing or other problems in the art with systems, methods, and non-transitory computer readable media that generate modified digital images utilizing nearest neighbor fields generated from previous patch matching operations. In particular, the disclosed systems can apply a solution from a saved patch matching operation to initialize patch matching for a different digital image. By utilizing a saved solution, the disclosed systems can efficiently generate a modified digital image based on the saved nearest neighbor field. To illustrate, the disclosed systems can access a nearest neighbor field for a digital image of a smaller resolution (e.g., a thumbnail digital image) to use in generating a digital image patch for a digital image of a larger resolution (e.g., a full-sized digital image). In some embodiments, the disclosed systems determine a target scale associated with a resolution of a first digital image and can utilize a nearest neighbor field of the first digital image to determine a nearest neighbor field for a second digital image at the target scale. In this manner, the disclosed systems can generate digital image patches for digital images of different resolutions, generate patches for different channels of a digital image or model (e.g., generate a patch match for a normal map based on a patch match for a gradient map), and/or generate patches in non-destructive applications.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
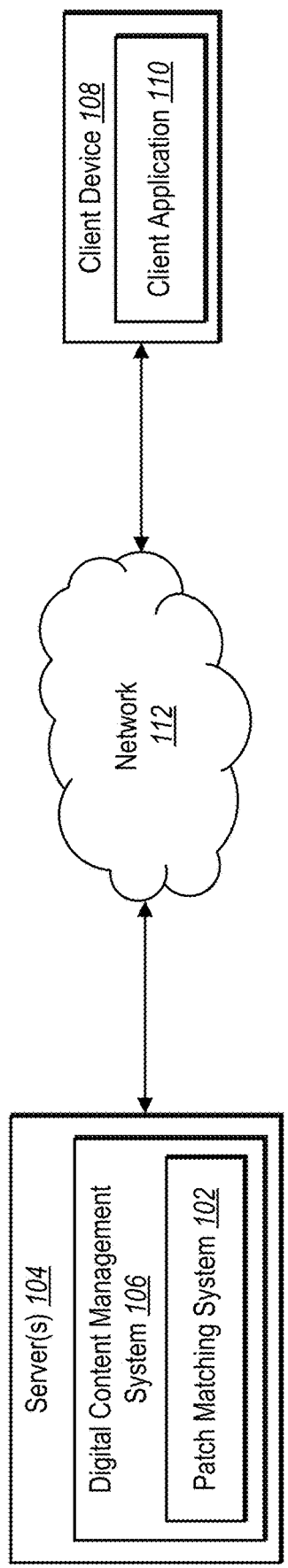
FIG. 1 illustrates an example system environment for implementing a patch matching system in accordance with one or more embodiments.

One or more embodiments described herein provide benefits and solve one or more of the foregoing or other problems in the art with a patch matching system that can generate digital image patches for a particular digital image based on a nearest neighbor field associated with a different digital image (e.g., a different digital image version or channel). In particular, the patch matching system can initialize a patch match algorithm at a target scale associated with a first digital image to generate digital image patches for a second digital image. The patch matching system can further utilize the patch match algorithm to iteratively determine nearest neighbor fields for the second digital image at various increasing scales starting with the target scale associated with the first digital image. By initializing at the target scale (e.g., avoiding analysis of scales below the target scale), the patch matching system can significantly reduce computer resources and increase the speed of filling a target region within digital images. Thus, the patch matching system can flexibly and efficiently fill gaps or replace pixels of digital images (e.g., stitched panoramic digital images), identify patches across different channels of digital images, and/or iteratively generate non-destructive patches in modifying digital images.

As just mentioned, the patch matching system can utilize a patch match algorithm (e.g., as part of a context aware fill model) to fill a target region within or adjacent to a digital image. Indeed, to generate a digital image patch for a digital image, the patch matching system can iteratively analyze the digital image to determine offsets (e.g., translations or other transformations) that indicate matching pixels for filling the target region at different scales. For example, the patch matching system can apply the patch match algorithm at a first scale to generate a first nearest neighbor field that includes a plurality of offsets and can apply the patch match algorithm at a second scale to generate a second nearest neighbor field that indicates different offsets at the second scale (and so forth for other scales as well).

Based on the patch match algorithm, the patch matching system can generate a modified digital image utilizing a nearest neighbor field associated with one digital image as an initialization for applying the patch match algorithm to another digital image. To elaborate, the patch matching system can seed or initialize the patch match algorithm with a nearest neighbor field obtained or generated from a first digital image of a first resolution (e.g., a thumbnail resolution). Based on the nearest neighbor field of the first digital image, the patch matching system can generate a nearest neighbor field (and one or more digital image patches) for a second digital image of a second resolution larger than the first resolution (e.g., high definition resolution). In some embodiments, the second digital image is a higher resolution version of the first digital image.

For instance, the patch matching system can analyze stitched panoramic digital images to fill missing or blurring regions. To alleviate some of the computational expense of patch matching over high-resolution stitched panoramic digital images, the patch matching system can analyze a thumbnail version of a stitched panoramic digital image to generate a nearest neighbor field for the thumbnail. Upon approval or acceptance of the thumbnail at a client device, the patch matching system can further utilize the generated thumbnail-affiliated nearest neighbor field as a starting point for generating a nearest neighbor field for a high-resolution version of the same stitched panoramic digital image.

Indeed, the patch matching system can initialize the patch match algorithm at a target scale based on a resolution of a first digital image. To elaborate, the patch matching system can utilize the nearest neighbor field of the first digital image as an initial nearest neighbor field solution for the second digital image at the target scale. The patch matching system can select the target scale based on the resolution (or dimensions) of the first digital image. For example, the patch matching system can select a target scale from a hierarchy of scales within the patch match algorithm that is closest to, but larger than, the resolution of the first digital image.

In some embodiments, the patch matching system determines that the resolution of the first digital image does not match or align with a target scale within a hierarchy of scale increments associated with the patch match algorithm. In such circumstances, the patch matching system can upsample the nearest neighbor field of the first digital image to match the closest target scale within the hierarchy.

Based on initializing the patch match algorithm utilizing the nearest neighbor field of the first digital image, the patch matching system determines a nearest neighbor field for the second digital image. In some embodiments, the patch matching system determines the closest target scale and initializes the patch match algorithm at the target scale to avoid processing pixels at other scales smaller than the target scale. Indeed, by initializing at the target scale, the patch matching system can refrain from determining nearest neighbor fields associated with scales smaller than the target scale. Thus, the patch matching system can apply the patch match algorithm starting at the target scale to determine a nearest neighbor field for the second digital image at the target scale. The patch matching system can further determine additional nearest neighbor fields for the second digital image at subsequent (larger) scales as the patch match algorithm upscales through successive iterations.

In some embodiments, the patch matching system compresses one or more nearest neighbor fields. In particular, the patch matching system can determine or select a final nearest neighbor field for generating a digital image patch for the second digital image. In addition, the patch matching system can compress the selected nearest neighbor field by utilizing a quantization technique to merge regions of the selected nearest neighbor field. For example, the patch matching system can merge regions of the nearest neighbor field based on similarities between the regions. Further, the patch matching system can store the compressed/quantized nearest neighbor field within a repository or database (e.g., for later use in determining a matching patch for an additional digital image).

As mentioned, the patch matching system can utilize a nearest neighbor field to generate a modified digital image. In particular, the patch matching system can utilize a nearest neighbor field to determine digital image patches to fill a target region associated with the second digital image. For example, in some embodiments, the patch matching system fills one or more target regions of a stitched panoramic digital image by inpainting pixels of the target region with pixels indicated by the nearest neighbor field.

As mentioned, in one or more embodiments, the patch matching system generates nearest neighbor fields based on different representations or channels of a digital image. For example, the patch matching system can apply the above methods to generate a nearest neighbor field associated with a representation of normals, gradients, colors, roughness, or other channel representations of digital models or digital images. Indeed, based on a nearest neighbor field associated with a digital representation of a first channel, the patch matching system can generate a nearest neighbor field for a digital representation of a second channel.

The patch matching system can provide several advantages over conventional digital image editing systems. For example, the patch matching system is more efficient than conventional systems. In particular, by utilizing a nearest neighbor field from a first digital image (e.g., a thumbnail image) to generate a nearest neighbor field for a second digital image (e.g., a high-resolution image), the patch matching system reduces the number of iterations (and corresponding computations) required to apply a patch match algorithm. By reducing the number of iterations for applying a patch match algorithm to generate digital image patches for a digital image, the patch matching system reduces processing power, memory, and computing time requirements.

The patch matching system can improve efficiency while also maintaining accuracy. Indeed, by utilizing an accurate, existing nearest neighbor field, the patch matching system can refrain from determining nearest neighbor fields associated with scales below a target scale. Thus, by avoiding the computational expense of analyzing a digital image at certain scales and initializing a target scale with an accurate estimate, the patch matching system can generate accurate digital image patches while utilizing less processing power, memory, and computing time.

In addition, the patch matching system can reduce computer storage and memory by utilizing a quantization technique to compress nearest neighbor fields. In particular, the patch matching system can utilize a quantization technique to store smaller, compressed versions of larger, more expensive nearest neighbor fields. The patch matching system can efficiently extract compressed nearest neighbor fields in analyzing additional digital images, thus consuming minimal storage and processing resources in re-using the nearest neighbor field to seed a subsequent patch match operation.

In addition, the patch matching system is more flexible than conventional systems. For example, rather than confining the application of a patch match algorithm to a single digital image (or digital images of a single resolution), the patch matching system can adapt the patch match algorithm to generate a nearest neighbor field for additional digital images based on a nearest neighbor field of a previous digital image. For instance, the patch matching system can apply a nearest neighbor field for a thumbnail digital image to a full-scale digital image. Similarly, the patch matching system can utilize a nearest neighbor field associated with a first channel representation (e.g., a normal map) to generate nearest neighbor fields associated with different channel representations (e.g., a gradient map or other channel representations of digital models or digital images). Further, the patch matching system can generate digital image patches for filling a target region of a digital image non-destructively.

As illustrated by the foregoing discussion, the present disclosure utilizes a variety of terms to describe features and benefits of the patch matching system. Additional detail is hereafter provided regarding the meaning of these terms as used in this disclosure. In particular, the term "nearest neighbor field" refers to a collection of one or more offsets that indicate pixels within a digital image or other channel representation. For example, a nearest neighbor field can include a plurality of offsets that each indicate or map to a different pixel or group of pixels that match a corresponding pixel or group of pixels. The patch matching system can utilize a nearest neighbor field to identify one or more digital image patches of pixels to fill a target region associated with a digital image. Such nearest neighbor fields can include image-specific nearest neighbor fields such as a first image nearest neighbor field associated with a first digital image and a second image nearest neighbor field associated with a second digital image. In addition, a nearest neighbor field can include a subsequent-scale nearest neighbor field that the patch matching system can generate for later scales within a hierarchy of scales.

Relatedly, the term "offset" refers to an operation, displacement, or transformation that the patch matching system can apply to identify or locate a pixel (or group of pixels) relative to another pixel (or group of pixels) within a digital image. Indeed, an offset can include a transformation (or other operation) that describes a relationship between a first pixel (or group of pixels) and a second pixel (or group of pixels). For example, an offset can include a particular form of patch comparison (e.g., a translation or a similarity transform matrix) to identify or map to a source pixel from a target pixel (or vice-versa). Example offsets can include a translation, a rotation, a similarity transform, a scaling, or absolute pixel coordinates within a digital image defining how to identify the location of a pixel (e.g., starting at a location of another pixel).

As mentioned, the patch matching system can utilize a nearest neighbor field including one or more offsets to generate a digital image patch for a digital image. As used herein, the term "digital image patch" (or sometimes simply "patch") refers to a group of one or more pixels that matches (or is within a threshold similarity of) a corresponding group of one or more pixels within a digital image. For example, a digital image patch can include one or more pixels that are indicated or identified via a nearest neighbor field. Thus, the patch matching system can utilize a digital image patch to fill a target region associated with a digital image.

Relatedly, as used herein, the term "digital image" refers to a digital visual representation (e.g., a visual portrayal of an object, a scene, or a person). A digital image can include a plurality of pixels that depict individual colors. A digital image can include a single still image or multiple digital images such as frames of a digital video. In some embodiments, a digital image can include a digital representation of values other than colors. For example, a digital image can include a representation of different channel information or signals for a digital model or a digital image such as normals, gradients, colors, roughness, or other channel information.

As used herein, the term "target region" refers to region or portion associated with a digital image that is to be filled or inpainted. For example, a target region can include a number of contiguous (or non-contiguous) pixels within a digital image that are blank, missing, or flawed. As another example, a target region can include a number of pixels adjacent to a digital image or between a given digital image and another digital image. Thus, the patch matching system can utilize a patch match algorithm to fill a target region with a digital image patch to, for example, stitch two images together to generate a panoramic digital image in a seamless fashion.

As mentioned above, the patch matching system can determine a target scale associated with a first digital image and can further determine a nearest neighbor field associated with a second digital image at the target scale. As used herein, the term "scale" refers to a level of granularity associated with a patch match algorithm. For example, a scale can correspond to dimensions or a resolution of analyzed portions of a digital image, where smaller scales correspond to smaller resolutions and larger scales correspond to larger resolutions. The patch matching system applies the patch match algorithm to generate a nearest neighbor field at a given scale based on analyzing groups of pixels at the given scale. In addition, a patch match algorithm can utilize a hierarchy of scales where each scale can result in a corresponding nearest neighbor field (determined via the patch match algorithm) for a given digital image. Thus, a "target scale" refers to a particular, selected, or identified scale within a hierarchy of scales utilized by a patch match algorithm. In particular, a target scale includes a scale selected based on a resolution of a first digital image to generate a nearest neighbor field for a second digital image. For example, the patch matching system can analyze a nearest neighbor field from a first digital image at a target scale (within a hierarchy of scales) to determine pixels to fill a target region for a second digital image.

Additionally, as used herein, the term "patch match algorithm" refers to a model or algorithm that generates nearest neighbor fields and/or digital image patches for digital images (e.g., as part of a context aware fill algorithm). For example, the patch match algorithm can include a variety of methods or techniques for determining offsets for pixels (or groups of pixels) within a digital image and selecting offsets to include within a nearest neighbor field for the digital image. Additionally, the patch match algorithm can include iterative acts of determining offsets at different scales to generate nearest neighbor fields at the different scales. Additional detail regarding the patch match algorithm is provided below with reference to FIGS. 4A-4C.

Additional detail regarding the patch matching system will now be provided with reference to the figures. For example, FIG. 1 illustrates a schematic diagram of an example system environment for implementing a patch matching system 102 in accordance with one or more embodiments. An overview of the patch matching system 102 is described in relation to FIG. 1. Thereafter, a more detailed description of the components and processes of the patch matching system 102 is provided in relation to the subsequent figures.

As shown, the environment includes server(s) 104, a client device 108, and a network 112. Each of the components of the environment can communicate via the network 112, and the network 112 may be any suitable network over which computing devices can communicate. Example networks are discussed in more detail below in relation to FIG. 11.

As mentioned, the environment includes a client device 108. The client device 108 can be one of a variety of computing devices, including a smartphone, a tablet, a smart television, a desktop computer, a laptop computer, a virtual reality device, an augmented reality device, or another computing device as described in relation to FIG. 11. Although FIG. 1 illustrates a single client device 108, in some embodiments the environment can include multiple different client devices, each associated with a different user. The client device 108 can communicate with the server(s) 104 via the network 112. For example, the client device 108 can receive user input from a user interacting with the client device 108 (e.g., via the client application 110) to edit a digital image and can provide the user input to the server(s) 104. Thus, the patch matching system 102 on the server(s) 104 can receive information or instructions to generate a modified digital image based on patch matching.

As shown, the client device 108 includes a client application 110. In particular, the client application 110 may be a web application, a native application installed on the client device 108 (e.g., a mobile application, a desktop application, etc.), or a cloud-based application where all or part of the functionality is performed by the server(s) 104. The client application 110 can present or display information to a user, including one or more digital images and/or user interface elements (e.g., editing tools) to edit or modify the digital image(s). A user can interact with the client application 110 to provide user input to, for example, select a target region of a digital image or indicate two or more digital images to stitch together.

As illustrated in FIG. 1, the environment includes the server(s) 104. The server(s) 104 may generate, track, store, process, receive, and transmit electronic data, such as digital images or nearest neighbor fields. For example, the server(s) 104 may receive data from the client device 108 in the form of a request to edit a digital image by generating a panoramic digital image. In addition, the server(s) 104 can transmit data to the client device 108 to provide a panoramic digital image including multiple digital images stitched together. Indeed, the server(s) 104 can communicate with the client device 108 to transmit and/or receive data via the network 112. In some embodiments, the server(s) 104 comprises a distributed server where the server(s) 104 includes a number of server devices distributed across the network 112 and located in different physical locations. The server(s) 104 can comprise a content server, an application server, a communication server, a web-hosting server, or a digital content management server.

As shown in FIG. 1, the server(s) 104 can also include the patch matching system 102 as part of a digital content management system 106. The digital content management system 106 can communicate with the client device 108 to generate, modify, and transmit digital content, such as modified digital images as well as various digital image editing tools.

Although FIG. 1 depicts the patch matching system 102 located on the server(s) 104, in some embodiments, the patch matching system 102 may be implemented by (e.g., located entirely or in part) on one or more other components of the environment. For example, the patch matching system 102 may be implemented by the client device 108 and/or a third-party device.

In some embodiments, though not illustrated in FIG. 1, the environment may have a different arrangement of components and/or may have a different number or set of components altogether. For example, the client device 108 may communicate directly with the patch matching system 102, bypassing the network 112. Additionally, the patch matching system 102 can include one or more databases (e.g., for storing nearest neighbor fields and/or digital images) housed on the server(s) 104 or elsewhere in the environment.

Figure 2:
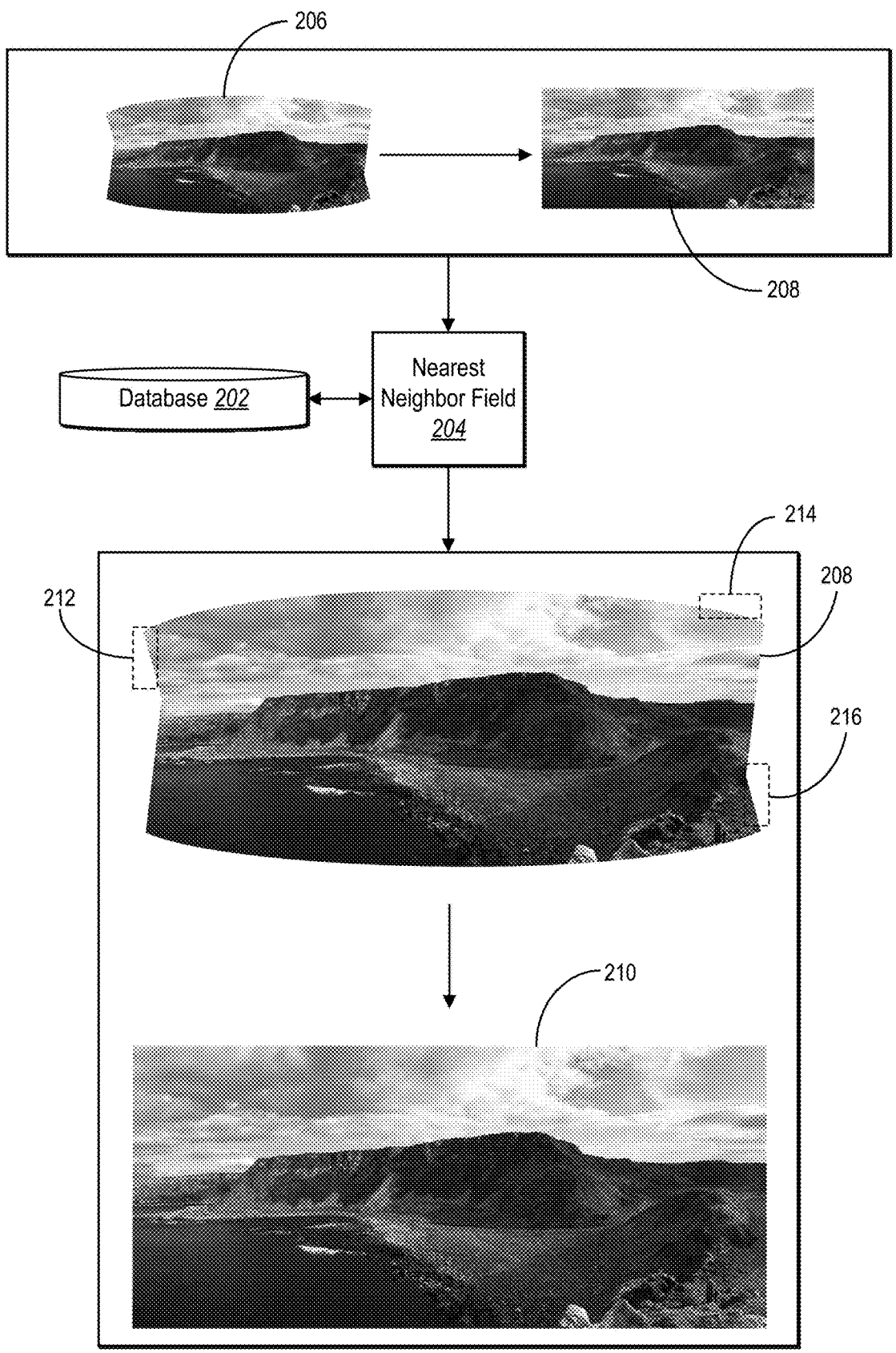
FIG. 2 illustrates generating a modified digital image based on a stored nearest neighbor field in accordance with one or more embodiments.

As mentioned, the patch matching system 102 can generate a modified digital image utilizing a patch match algorithm with respect to one or more digital images. For example, the patch matching system 102 can fill or inpaint a target region of a digital image such as a panoramic digital image that is composed of multiple constituent digital images stitched together. In particular, the patch matching system 102 can utilize a stored nearest neighbor field associated with a thumbnail version of a panoramic digital image to generate a modified full-size version of the panoramic digital image. FIG. 2 illustrates generating a modified digital image 210 by filling target regions such as the target regions 212, 214, and 216 of the digital image 208.

As shown in FIG. 2, the patch matching system 102 generates a nearest neighbor field 204 based on utilizing a patch match algorithm to fill pixels of the thumbnail digital image 206 (e.g., a digital image with a small resolution of 240×320 pixels). In particular, the patch matching system 102 utilizes the patch match algorithm to identify target regions of the thumbnail digital image 206 to fill with corresponding pixels indicated by the nearest neighbor field 204. The patch matching system 102 further generates the nearest neighbor field 204 by determining various scale-specific nearest neighbor fields at different scales of the patch match algorithm and selecting the nearest neighbor field that best fills the target regions of the thumbnail digital image 206. Thus, the patch matching system 102 generates the modified thumbnail digital image 208 by filling in the target regions of the thumbnail digital image 206 utilizing the nearest neighbor field 204.

In some embodiments, the patch matching system 102 further stores the nearest neighbor field 204 within the database 202. Thus, the patch matching system 102 can access the nearest neighbor field 204 and apply the nearest neighbor field 204 to other digital images such as the digital image 208 (e.g., a high-resolution version of the thumbnail digital image 206). For example, the patch matching system 102 accesses the stored nearest neighbor field 204 from the database 202.

To elaborate, the patch matching system 102 accesses the nearest neighbor field 204 that includes offsets indicating digital image patches for the thumbnail digital image 206. For instance, the patch matching system 102 utilizes the nearest neighbor field 204 as an initial nearest neighbor field for processing the digital image 208. Thus, in applying a patch match algorithm to the digital image 208, the patch matching system 102 utilizes the stored nearest neighbor field 204 as a seed to begin iterating through the patch match algorithm, starting at a scale of the nearest neighbor field 204, to generate subsequent nearest neighbor fields (corresponding to respective scales) for the digital image 208.

In particular, the patch matching system 102 applies a patch match algorithm to generate one or more nearest neighbor fields for the digital image 208. Based on the nearest neighbor fields, the patch matching system 102 further determines digital image patches to fill the target regions 212, 214, and 216 of the digital image 208. As shown in FIG. 2, the patch matching system 102 generates the modified digital image 210 (e.g., a filled-in or inpainted version of the panoramic digital image 208) by filling the target regions 212, 214, and 216. Indeed, the patch matching system 102 generates digital image patches of matching pixels to fill the target regions 212, 214, and 216 in a seamless manner so that the modified digital image 210 appears realistic.

In some embodiments, the patch matching system 102 determines digital image patches to fill target regions other than those target regions 212, 214, and 216 indicated in FIG. 2. For example, the patch matching system 102 identifies missing portions of the digital image 208 and generates digital image patches to fill target regions defined by the missing portions (e.g., those portions near the rounded edges, the left side, and the right side of the digital image 208). In other embodiments, the patch matching system 102 identifies a target region in the form of a pixelated, broken, or blurry portion of the digital image 208 and determines one or more digital image patches to fill the target region.

Figure 3:
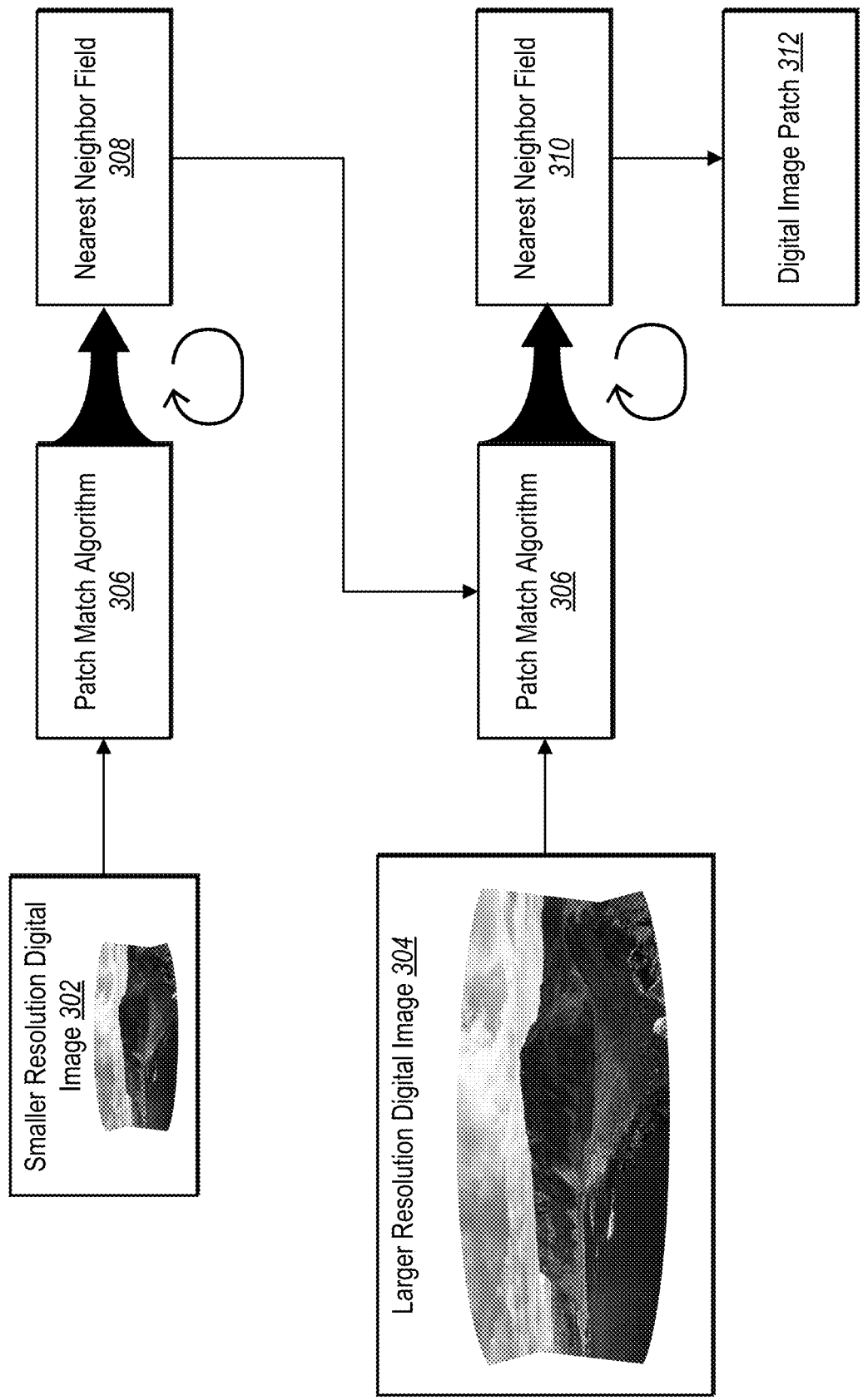
FIG. 3 illustrates generating a digital image patch for a second digital image based on a nearest neighbor field of a first digital image in accordance with one or more embodiments.

As mentioned above, the patch matching system 102 can generate digital image patches for a digital image (e.g., the digital image 208) based on a nearest neighbor field associated with a different digital image (e.g., the nearest neighbor field 204 of the thumbnail digital image 206). FIG. 3 illustrates generating a digital image patch 312 for a larger resolution digital image 304 based on a nearest neighbor field 308 associated with a smaller resolution digital image 302 in accordance with one or more embodiments.

As illustrated in FIG. 3, the patch matching system 102 utilizes a patch match algorithm 306 to generate a first image nearest neighbor field 308 for a smaller resolution digital image 302 (e.g., the thumbnail digital image 206). For example, the first image nearest neighbor field 308 can represent a final nearest neighbor field utilized to inpaint the smaller resolution digital image 302. To elaborate, the patch matching system 102 applies the patch match algorithm 306 to the smaller resolution digital image 302 multiple times (as indicated by the circular arrow) to determine nearest neighbor fields at different scales. Indeed, the patch matching system 102 determines a first nearest neighbor field at a first scale, upscales to a second scale, and determines a second nearest neighbor field at the second scale, and so forth. The patch matching system 102 further determines or selects a final nearest neighbor field 308 that is the most accurate (or that satisfies an accuracy threshold).

In some embodiments, the patch matching system 102 receives input from a client device 108 indicating user satisfaction of patch matching results based on a given nearest neighbor field. For example, utilizing a nearest neighbor field, the patch matching system 102 generates a digital image patch to fill a target region associated with the smaller resolution digital image 302 and provides a modified digital image for display to a user (e.g., via the client device 108). The patch matching system 102 receives input from the client device 108 to indicate whether or not the modification made to the smaller resolution digital image 302 is satisfactory. Based on receiving input that the user is satisfied with the results of the patch match algorithm 306, the patch matching system 102 determines the corresponding nearest neighbor field to be the final nearest neighbor field (or the nearest neighbor field 308) for the smaller resolution digital image 302.

Based on determining the first image nearest neighbor field 308 for the smaller resolution digital image 302, the patch matching system 102 further applies the patch match algorithm 306 to a larger resolution digital image 304 (e.g., the digital image 208) to generate a nearest neighbor field 310 and a corresponding digital image patch 312. In particular, the patch matching system 102 initializes the patch match algorithm 306 with the first image nearest neighbor field 308 from the smaller resolution digital image 302. Indeed, the patch matching system 102 utilizes the first image nearest neighbor field 308 as an initial nearest neighbor field for the larger resolution digital image 304. Based on the first image nearest neighbor field 308, the patch matching system 102 utilizes the patch match algorithm 306 to determine additional nearest neighbor fields (e.g., a second image nearest neighbor field and subsequent scale nearest neighbor fields) for the larger resolution digital image 304 as well.

More specifically, the patch matching system 102 determines a target scale (e.g., a scale associated with the nearest neighbor field 308) for the larger resolution digital image 304. For example, the patch matching system 102 determines a target scale of the patch match algorithm 306 based on the resolution of the smaller resolution digital image 302. The patch matching system 102 then initializes the patch match algorithm 306 at the target scale. Indeed, the patch matching system 102 does not generate nearest neighbor fields at scales below the target scale and instead utilizes the patch match algorithm 306 to generate a nearest neighbor field at the target scale and for larger scales thereafter.

For instance, the patch matching system 102 generates a second image neighbor field at the target scale and upscales the patch match algorithm 306 to generate a subsequent scale nearest neighbor field at a subsequent scale larger than the target scale. Thus, as indicated by the circular arrow, the patch matching system 102 generates multiple nearest neighbor fields, each corresponding to a respective scale, for the larger resolution digital image 304. In some embodiments, the patch matching system 102 determines or selects a nearest neighbor field 310 that satisfies a threshold accuracy as a final nearest neighbor field. For example, the patch matching system 102 generates the nearest neighbor field 310 that results in a digital image patch 312 that is satisfactory to a user. Indeed, the patch matching system 102 can receive user input via the client device 108 to indicate that the digital image patch 312 fills a target region associated with the larger resolution digital image 304 satisfactorily.

As mentioned, the nearest neighbor field 310 includes offsets that indicate pixels to fill a target region of the larger resolution digital image 304. For example, the nearest neighbor field 310 can include offsets that indicate absolute positions (e.g., pixel coordinate locations) of one or more digital image patches (e.g., the digital image patch 312) within the larger resolution digital image 304. Alternatively (or additionally), the nearest neighbor field 310 can include offsets that indicate a displacement from one pixel location to another for locating digital image patches. For example, the patch matching system 102 can subtract a relative pixel location from its absolute position to determine a pixel displacement from a given source pixel. Based on the nearest neighbor field 310, the patch matching system 102 generates the digital image patch 312 to fill a target region associated with the larger resolution digital image 304.

In some embodiments, the patch matching system 102 can utilize digital images with different resolutions, where the first digital image is not necessarily smaller than the second digital image. For example, the patch matching system 102 can generate the nearest neighbor field 308 in relation to a larger resolution digital image for initializing the patch match algorithm 306 relative to a smaller resolution digital image. In one or more embodiments, for instance, the patch matching system 102 can down-sample the nearest neighbor field 308 to a target scale corresponding to a smaller resolution digital image.

Figure 4C:
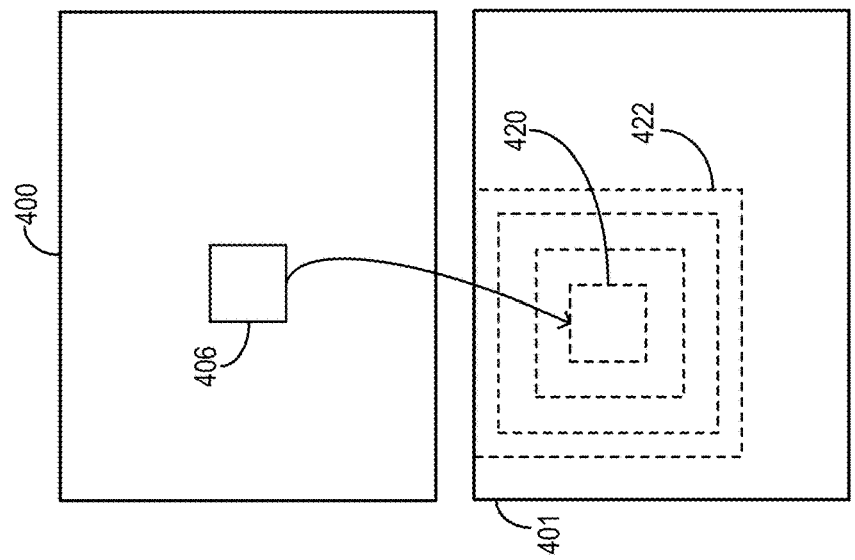
FIGS. 4A-4C illustrate utilizing a patch match algorithm to determine offsets in accordance with one or more embodiments.
Figure 4B:
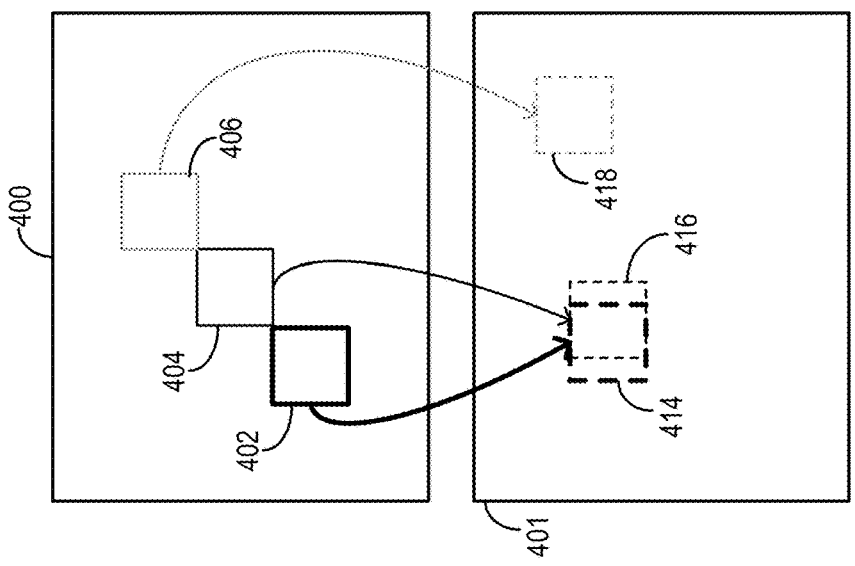
Figure 4A:
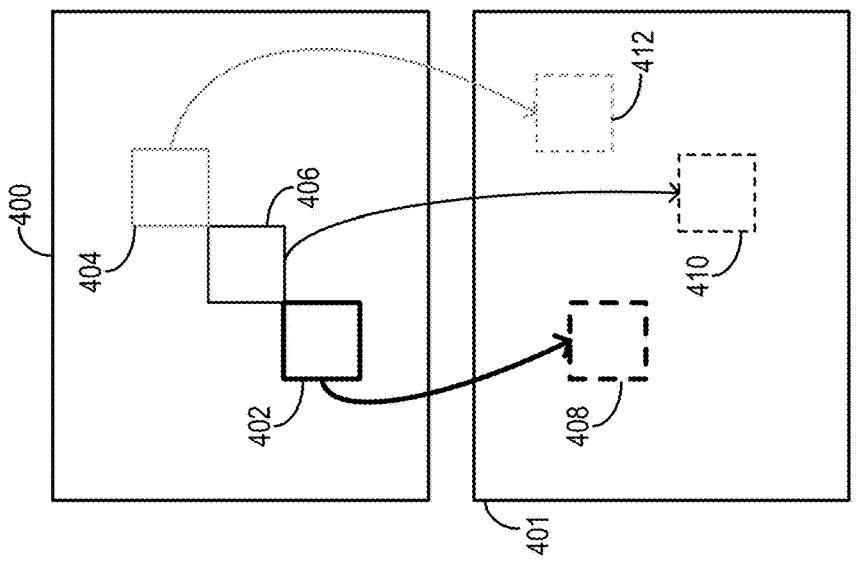

As mentioned, the patch matching system 102 utilizes a patch match algorithm (e.g., the patch match algorithm 306) to generate nearest neighbor fields and digital image patches for modifying digital images (e.g., starting at a target scale). FIGS. 4A-4C illustrate utilizing the patch match algorithm 306, including various operations such as initialization (FIG. 4A), propagation (FIG. 4B), and search (FIG. 4C), in accordance with one or more embodiments. Indeed, FIGS. 4A-4C respectively illustrate three different operations—initialization, propagation, and search—that the patch matching system 102 performs with respect to individual pixels or groups of pixels at a particular scale. Indeed, the patch matching system 102 can perform the initialization, propagation, and search of FIGS. 4A-4C at a given scale, upscale, and perform the initialization, propagation, and search operations again at a new scale. The digital image 401 and the target region 400 of FIGS. 4A-4C are not necessarily drawn proportionately but are rather illustrated as similar in size for the sake of visual clarity and discussion. For similar reasons, even though the target region 400 may or may not be located within the digital image 401, FIGS. 4A-4C illustrate the target region 400 separate from the digital image 401 for discussion purposes.

As shown in FIG. 4A, the patch matching system 102 performs an initialization operation by determining initial offsets for pixels within a target region 300. In particular, the patch matching system 102 randomly determines initial offsets from locations within a digital image 401 (e.g., the smaller resolution digital image 302 or the larger resolution digital image 304) for each of the pixels 402, 404, and 406. For example, the patch matching system 102 identifies an initial offset 408 that corresponds to the pixel (or group of pixels) 402. Similarly, the patch matching system 102 identifies an initial offset 410 that corresponds to the pixel (or group of pixels) 406. Further, the patch matching system 102 identifies an initial offset 412 that corresponds to the pixel (or group of pixels) 404.

To determine the initial offsets 408, 412, and 410 from the pixels 402, 404, and 406, respectively, the patch matching system 102 randomly selects offsets from within the digital image 401. Indeed, the patch matching system 102 randomly selects offsets for each of the pixels (or groups of pixels) within the target region 400 as part of the initialization operation. In some embodiments, for example, the patch matching system 102 utilizes a hash-based random initialization algorithm to determine the initial offsets.

As mentioned above, the patch matching system 102 further performs a propagation operation. Indeed, FIG. 4B illustrates determining propagation offsets for pixels of the target region 400. As illustrated, the patch matching system 102 determines propagation offsets within the digital image 401 for each of the pixels 402, 404, and 406. Indeed, the patch matching system 102 identifies a propagation offset 414 corresponding to the pixel 402. Similarly, the patch matching system 102 identifies a propagation offset 416 corresponding to the pixel 404. Further, the patch matching system 102 identifies a propagation offset 418 corresponding to the pixel 406.

Additionally, the patch matching system 102 determines propagation offsets for each of the other pixels within the target region 400. Further, although FIG. 4B illustrates determining a single propagation offset for each pixel within the target region 400, in some embodiments the patch matching system 102 determines multiple (e.g., two or more) propagation offsets for each of the pixels (e.g., the pixels 402, 404, and 406).

To determine the propagation offsets 414, 416, and 418, the patch matching system 102 identifies offsets associated with different pixels within the target region 400. To elaborate, in relation to the pixel 402, the patch matching system 102 looks to a neighboring (e.g., adjacent) pixel within the target region 400 and identifies an offset (e.g., an initial offset) associated with the neighboring pixel. The patch matching system 102 designates or assigns the offset of the neighboring pixel as a propagation offset associated with the pixel 402. Likewise, for the pixels 404 and 406, the patch matching system 102 performs similar operations to determine propagation offsets associated with neighboring pixels. For example, the patch matching system 102 determines the propagation offset 416 for the pixel 406 and likewise determines the propagation offset 418 for the pixel 404. In some embodiments, the patch matching system 102 can determine propagation offsets simultaneously for more than one pixel in parallel.

As further mentioned, the patch matching system 102 additionally performs a search (e.g., a random search) operation. FIG. 4C illustrates a random search within the digital image 401 in relation to the pixel 406. As illustrated, in conjunction with performing the propagation operation of FIG. 4B, the patch matching system 102 further performs a search operation to identify search offsets in relation to individual pixels. For instance, the patch matching system 102 determines search offsets for the pixels 402, 404, and 406 upon identifying the propagation offsets for each of the pixels 402, 404, and 406, respectively. As shown in FIG. 4C, for example, the patch matching system 102 identifies a search offset 420 in relation to the pixel 406. To identify the search offset 420, the patch matching system 102 identifies a search area 422 and performs a random search within the search area 422.

To identify the search area 422, the patch matching system 102 centers a rectangular (e.g., a concentric square) area within the digital image 401 around a current selected offset (e.g., an initialization offset, a propagation offset, or a search offset from the same scale or a previous scale). To determine the current selected offset, the patch matching system 102 compares offsets. In relation to the pixel 402, for example, the patch matching system 102 compares the initial offset 408 with the propagation offset 414 (and/or other offsets from previous iterations/scales). In particular, the patch matching system 102 compares the initial offset 408 with the propagation offset 414 by determining which offset is closer to the pixel 402. For example, the patch matching system 102 determines a minimum between an initial offset and a propagation offset to select, as a current offset for the pixel 402, the offset that is the closer match. The patch matching system 102 further determines current selected offsets by comparing initial offsets and propagation offsets for pixels 404 and 406 in like fashion. Thus, the patch matching system 102 determines a currently selected offset around which to center the search area 422.

To generate a selected offset for a given pixel, the patch matching system 102 further compares identified search offsets with initial offsets and/or propagation offsets. Taking the example of FIG. 4C, for instance, the patch matching system 102 compares the search offset 420 corresponding to the pixel 406 with the propagation offset 416 and the initial offset 410. In particular, the patch matching system 102 determines which offset is a closest match to the pixel 406. In some embodiments, however, the patch matching system 102 compares the search offset 420 with a currently selected offset (e.g., an offset selected from a previous scale's iteration of the patch match algorithm 306).

For example, the patch matching system 102 can determine offsets for a nearest neighbor field (e.g., the nearest neighbor field 310) based on determining and comparing initialization offsets, propagation offsets, and search offsets by implementing a process similar to the following pseudo-code:

```
For all scale, s, do {
    For all EM iteration, emi do {
        1. Initialize Random Field
        2. Search (a. Propagation followed by b. Random search)
        If an NNF from previous iterations {
            3. NNF = Min (NNF, Previous NNF)
            Search (Sequential followed by Random)
        }
        4. Vote
    }
    5. Upscale the current solution for the next scale
}
```

Figure 5:
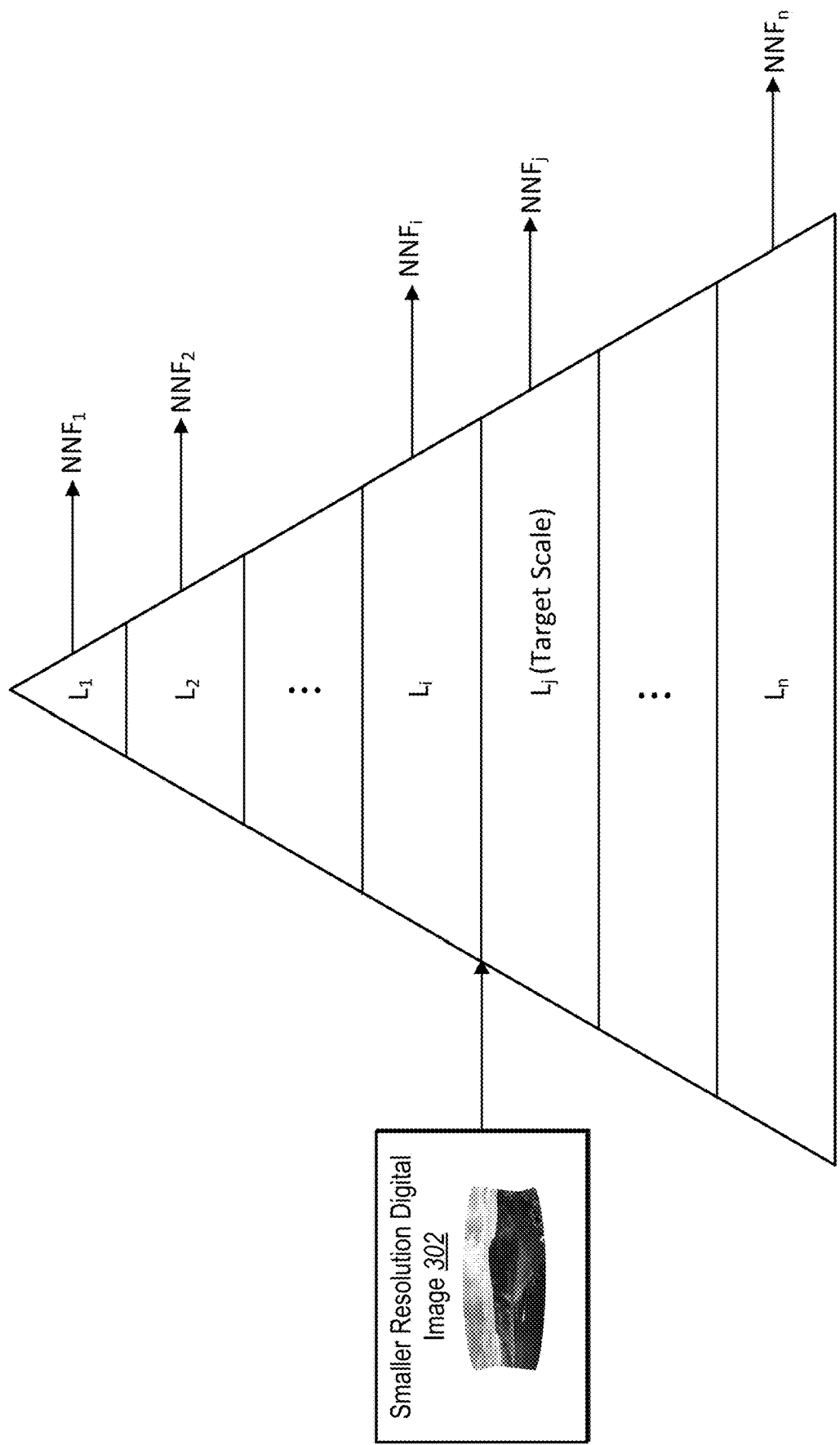
FIG. 5 illustrates determining a target scale associated with a digital image in accordance with one or more embodiments.

As mentioned, the patch matching system 102 can initialize the patch match algorithm 306 by utilizing a nearest neighbor field (e.g., the nearest neighbor field 308) associated with a first digital image (e.g., the smaller resolution digital image 302) for a second digital image (e.g., the larger resolution digital image 304). FIG. 5 illustrates determining a scale for initializing the patch match algorithm 306 based on the resolution of a first digital image in accordance with one or more embodiments. As shown in FIG. 5, the scales $L_1$ to $L_n$ are pyramidal in that each successive scale corresponds to an increased resolution or increased dimensions.

Indeed, as shown in FIG. 5, the patch match algorithm 306 analyzes pixels of a digital image at particular scales within a hierarchy of scales $L_1$ to $L_n$, each scale corresponding to a respective iteration of the patch match algorithm 306 (and thus a respective nearest neighbor field $NNF_1$ to $NNF_n$). From the hierarchy of scales, the patch matching system 102 determines a scale associated with a given digital image. Thus, to initialize the patch match algorithm 306 for generating the nearest neighbor field 310 for the larger resolution digital image 304, the patch matching system 102 determines a target scale within the hierarchy of scales that corresponds to the resolution or dimensions of the smaller resolution digital image 302.

Starting from the first scale $L_1$ of the patch match algorithm 306, the patch matching system 102 determines whether or not the scale of the nearest neighbor field 308 associated with the smaller resolution digital image 302 is smaller than or equal to the scale of $L_1$. The patch matching system 102 similarly compares the scale of the nearest neighbor field 308 with other scales $L_2$ to $L_n$ of the patch match algorithm 306. Upon identifying a scale (e.g., the scale $L_j$) of the patch match algorithm 306 that is equal to or larger than the scale associated with the nearest neighbor field 308, the patch matching system 102 identifies or designates that scale as the target scale. In some embodiments, the patch matching system 102 compares the resolution of the smaller resolution digital image 302 with the scales $L_1$ to $L_n$ to determine a target scale for initializing the patch match algorithm 306.

Indeed, as illustrated in FIG. 5, the patch matching system 102 compares the scale associated with the smaller resolution digital image 302 (or the nearest neighbor field 308) with the scales $L_1$ to $L_n$. For instance, the patch matching system 102 compares the scale of the nearest neighbor field 308 with the first scale $L_1$ and then compares the scale of the nearest neighbor field 308 to the second scale $L_2$ and so forth through the hierarchy of scales. In some embodiments, the patch matching system 102 identifies a designated scale within the hierarchy of scales that matches or is equal to the scale of the nearest neighbor field 308. The patch matching system 102 thus determines the matching scale as the target scale for the patch match algorithm 306. In other embodiments, however, the patch matching system 102 determines that none of the scales $L_1$ to $L_n$ match or are equal to the scale associated with the smaller resolution digital image 302 (or the nearest neighbor field 308). In these embodiments, the patch matching system 102 identifies the closest, larger designated scale within the hierarchy of scales $L_1$ to $L_n$.

For example, as shown in FIG. 5, the patch matching system 102 determines that the scale $L_j$ is larger than, and nearest to, the scale of the nearest neighbor field 308 within the hierarchy of scales $L_1$ to $L_n$. Based on identifying the target scale (e.g., the closest larger scale $L_j$), the patch matching system 102 initializes the patch match algorithm 306.

Indeed, the patch matching system 102 utilizes the nearest neighbor field 308 as a nearest neighbor field for the larger resolution digital image 304 at the target scale. In other words, the patch matching system 102 utilizes the nearest neighbor field 308 when running the patch match algorithm 306 at the target scale (e.g., rather than determining a nearest neighbor field by running initialization, propagation, and search operations at the target scale as discussed in FIGS. 4A-4C). For example, rather than performing initialization, propagation, and search operations at the target scale, the patch matching system 102 can utilize the nearest neighbor field 308. The patch matching system 102 can perform a voting operation with regard to pixels utilizing the nearest neighbor field 308 at the target scale, thus utilizing the nearest neighbor field 308 to seed operations at subsequent scales of the patch match algorithm 306

For instance, upon utilizing the nearest neighbor field 308 at the target scale, the patch matching system 102 can determine nearest neighbor fields corresponding to subsequent scales (i.e., as the patch matching system 102 propagates through the scaled iterations of the patch match algorithm 306). For example, the patch matching system 102 can upscale the nearest neighbor field resulting from analysis at the target scale, then perform an initialization, propagation, and search operation at the next scale. By performing a voting operation, the patch matching system 102 can identify a nearest neighbor field at the next scale. The patch matching system 102 can process to an additional scale. Notably, as the patch matching system 102 iterates through different scales, each nearest neighbor field at each scale is based on the nearest neighbor field 308 utilized to seed the analysis at the target scale.

Further, as illustrated in FIG. 5, the patch matching system 102 avoids or refrains from determining nearest neighbor fields for scales smaller than the target scale (e.g., the closest larger scale $L_j$). Indeed, by initializing the patch match algorithm 306 at the target scale $L_j$ utilizing the nearest neighbor field 308, the patch matching system 102 need not analyze the scales from $L_1$ to $L_j$. Accordingly, the patch match algorithm 306 saves computer resources that might otherwise be required to process computationally-expensive lower-resolution iterations of the patch match algorithm 306.

In some embodiments, the patch matching system 102 does not refrain from determining nearest neighbor fields for scales smaller than the target scale but instead determines nearest neighbor fields for those scales as well. In these embodiments, the patch matching system 102 nevertheless improves efficiency over conventional systems by initializing the patch match algorithm 306 with a nearest neighbor field that already produces accurate results for the smaller resolution digital image 302.

To upscale through subsequent scales of the patch match algorithm 306, the patch matching system 102 starts at the target scale and upsamples to increase the resolution of the patch match algorithm 306 (e.g., the of initialization, propagation, and/or search operations) by a given factor. In some embodiments, upsampling can involve additional or alternative operations. For example, upon determining a nearest neighbor field at a given scale, the patch matching system 102 upsamples to the next scale by determining relationships between similarity transforms or other offsets that indicate pixel locations at the first scale to determine an upscaled version of how to identify corresponding pixel locations at the next scale (e.g., via rotation, translation, or some other transform). Thus, the patch matching system 102 upscales the resolution of the patch match algorithm 306 to analyze groups of pixels of different sizes.

To illustrate, the following algorithm/pseudocode provides an example process by which the patch matching system 102 can generate nearest neighbor fields utilizing the patch match algorithm 306 initialized based on the smaller resolution digital image 302. In addition, the following algorithm/pseudocode provides functions for the patch matching system 102 to upsample a nearest neighbor field based on a determination that the scale of the nearest neighbor field associated with the smaller resolution digital image 302 does not match a scale of the patch match algorithm 306.

```
If (a nearest neighbor field stream exists to read from or stored in a database)
{
    S_NNF = Read and decompress nearest neighbor field stream
}
First = true;
For all scale, s, do {
    If (First && Dimensions associated with S_NNF <= Dimensions of current scale)
    {
        First = false;
        Goto upsampleNNF;
    }
    For all EM iteration, emi do
    }
        1. Initialize Random Field;
        2. Search (a. Propagation followed by b. Random search);
        If (we have a nearest neighbor field from previous iterations)
        {
            3. NNF = Min (NNF, Previous NNF);
            Search (Sequential followed by Random);
        }
        4. Vote;
    }
upsampleNNF;
5. Upscale the current solution for the next scale;
6. Vote;
}
If (a stored nearest neighbor field stream is needed)
{
    Compress and save nearest neighbor field;
}
``` where S_NNF represents a nearest neighbor field solution accessed within a database (e.g., the nearest neighbor field 308 associated with the smaller resolution digital image 302). In some embodiments, the description of FIGS. 3-5, including the above pseudo-code, sets forth the corresponding algorithm(s) (or structure) for a step for generating a digital image patch for a second digital image utilizing the nearest neighbor field of the first digital image.

By way of example, the smaller resolution digital image 302 can have a resolution of 220 pixels by 220 pixels. Within the hierarchy of scales, the scale $L_i$ can have (or correspond to) a resolution of 200 pixels by 200 pixels, and the scale $L_j$ can have (or correspond to) a resolution of 240 pixels by 240 pixels. Thus, in determining the target scale to initialize the patch match algorithm 306 based on the resolution of the smaller resolution digital image 302, the patch matching system 102 determines that the target scale is $L_j$ because it is the closest larger scale to the resolution of the smaller resolution digital image 302 within the hierarchy.

In addition, the patch matching system 102 determines that the resolution of the smaller digital image 302 (220×220 pixels) does not match the target scale $L_j$. In some embodiments, the patch matching system 102 determines that the scale of the nearest neighbor field associated with the resolution 220×220 does not match the scale of the nearest neighbor field associated with the target scale $L_j$ at 240×240. Based on this determination, the patch matching system 102 further upsamples the nearest neighbor field associated with the smaller resolution digital image 302 to match the target scale $L_j$ (or the nearest neighbor field corresponding to the target scale $L_j$). For example, the patch matching system 102 modifies the dimensions of the nearest neighbor field associated with the smaller resolution digital image 302 to match the dimensions of the target scale $L_j$ (e.g., 240×240).

Figure 6:
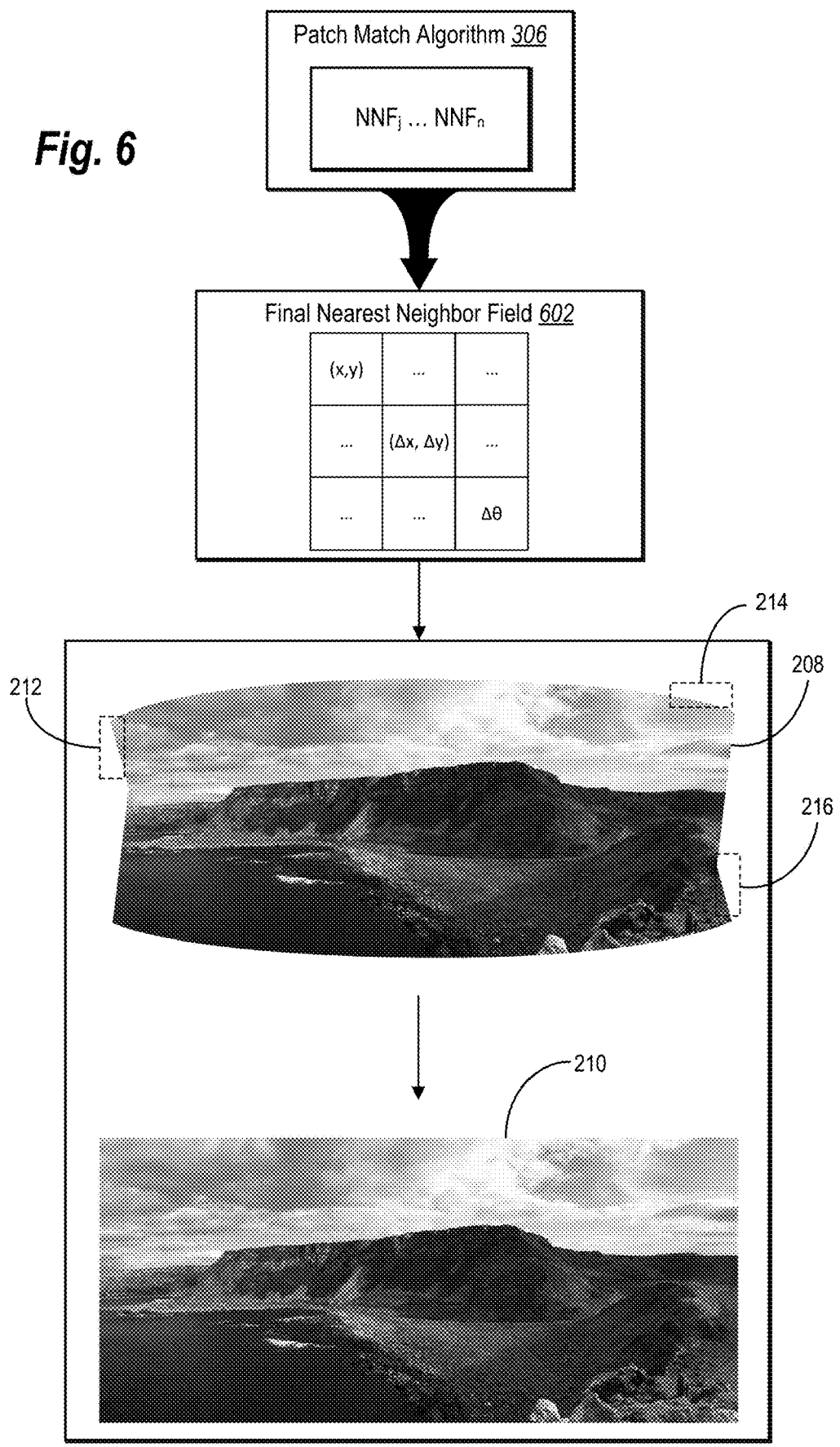
FIG. 6 illustrates filling a target region utilizing a final nearest neighbor field in accordance with one or more embodiments.

As mentioned, the patch matching system 102 can generate a modified digital image from an initial digital image by utilizing a patch match algorithm initialized based on a nearest neighbor field associated with a different digital image. FIG. 6 illustrates generating the panoramic digital image 210 utilizing the patch match algorithm 306 in accordance with one or more embodiments. As shown, the patch matching system 102 utilizes the patch match algorithm 306 to generate nearest neighbor fields $NNF_j$ to $NNF_n$ starting at the target scale $L_j$ and determines a final nearest neighbor field 602 from among the nearest neighbor fields of different scales.

As illustrated in FIG. 6, the patch matching system 102 determines a final nearest neighbor field 602 for a digital image such as the larger resolution digital image 304 or the digital image 208. The final nearest neighbor field 602 can include one or more types of offsets indicating relationships between pixels or groups of pixels. For example, the final nearest neighbor field 602 can include absolute coordinates such as (x,y) or can include other offsets such as translational displacement (Δx, Δy) and/or changes in rotation angle Δθ (e.g., as part of a similarity transformation matrix). In some cases, to locate patches to fill a target region, a rotation, translation, and/or other transformation of the patch may be required to properly fill the target region.

The patch matching system 102 performs a vote operation (as shown in the above pseudo-code) to generate the needed color (or other signal) values from a final nearest neighbor field 602.

For instance, the patch matching system 102 can performs a vote operation as described by Connelly Barnes, Eli Shechtman, Adam Finkelstein, and Dan B. Goldman in *Patchmatch: A Randomized Correspondence Algorithm for Structural Image Editing*, ACM Transactions on Graphics (2009), which is incorporated by reference herein in its entirety. In some embodiments, the patch matching system 102 votes to accumulate values of pixels (or groups of pixels). In these or other embodiments, the patch matching system 102 also averages the accumulated values (from the voting) to generate a new digital image.

Based on determining a final nearest neighbor field 602, the patch matching system 102 generates the modified digital image 210 by filling the target regions 212, 214, and 216 of the digital image 208. Indeed, the patch matching system 102 fills the target regions 212, 214, and 216 by utilizing the final nearest neighbor field 602 to identify digital image patches to fill corresponding target regions or portions of the target regions.

As shown in FIG. 6, the digital image 208 includes various target regions such as the target regions 212, 214, and 216 as well as corresponding patches identified via the final nearest neighbor field 602. By generating digital image patches based on the final nearest neighbor field 602, the patch matching system 102 fills the target regions 212, 214, and 216 of the digital image 208. Thus, the patch matching system 102 generates the modified digital image 210.

As mentioned above, the patch matching system 102 can utilize the patch match algorithm 306 non-destructively. More specifically, the patch matching system 102 can modify digital images utilizing the patch match algorithm 306 without losing digital image information—e.g., without overwriting or removing pixels. Indeed, in preserving original image data, the patch matching system 102 can store nearest neighbor fields (e.g., the final nearest neighbor field 602) or other modification settings on a per-image basis, separately from original digital image files, thus enabling the patch matching system 102 to undo changes or revert back to previous states. The patch matching system 102 can utilize a first nearest neighbor field (for a first non-destructive modification to a digital image) in generating a patch match (for a second non-destructive modification).

As an example, the patch matching system 102 utilizes the final nearest neighbor field 602 to generate a non-destructive patch match for filling the target region 212. Based on the initial non-destructive patch match (corresponding to the final nearest neighbor field 602), the patch matching system 102 also generates a subsequent non-destructive patch match. For example, the patch matching system 102 can receive a request via user input to generate an additional patch match for a subsequent modified version of the digital image, and the patch matching system 102 can utilize the final nearest neighbor field 602 to generate the additional patch match for the modified digital image.

Figure 7:
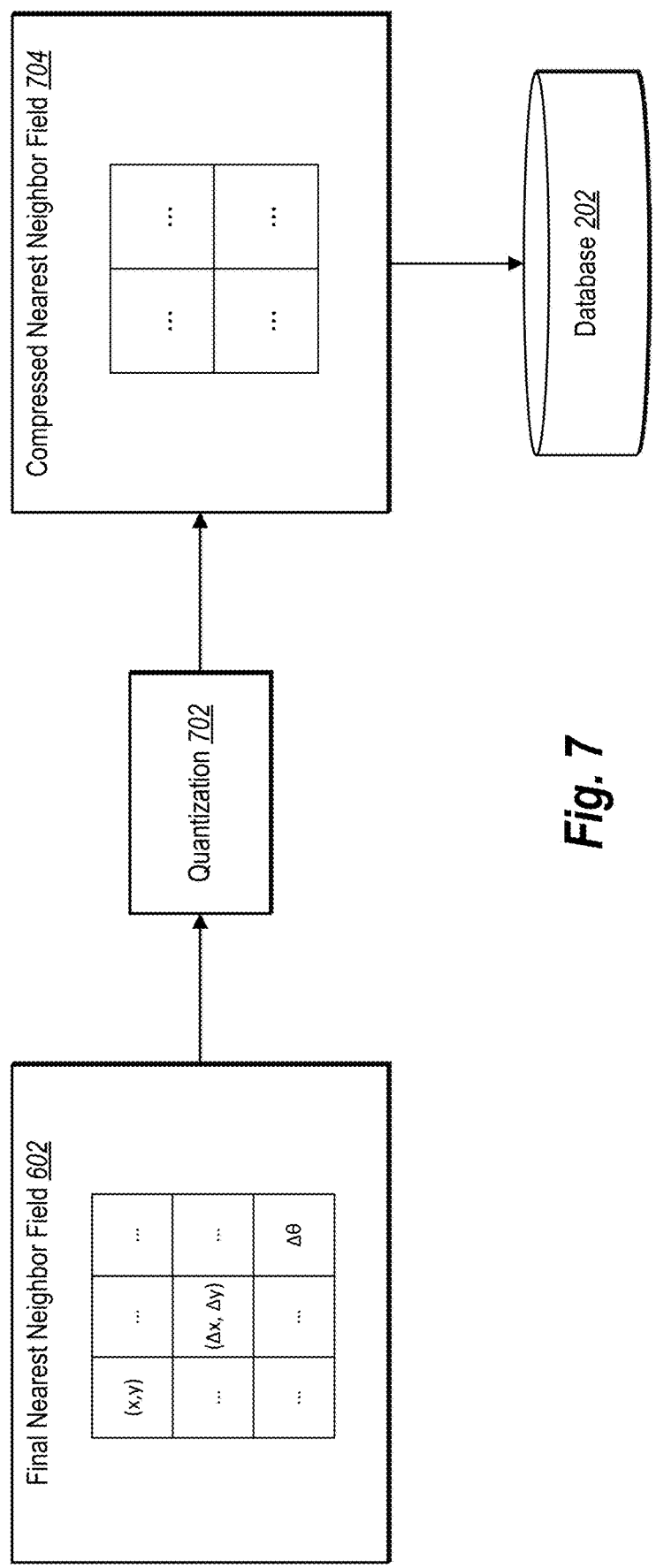
FIG. 7 illustrates compressing and storing a nearest neighbor field in accordance with one or more embodiments.

As mentioned, the patch matching system 102 can store a nearest neighbor field (e.g., the final nearest neighbor field 602) within a database (e.g., the database 202) for later use in relation to a subsequent digital image. As also mentioned, the patch matching system 102 can compress a nearest neighbor field to reduce its size for more efficient usage of computer storage within a database. FIG. 7 illustrates compressing and storing the final nearest neighbor field 602 in accordance with one or more embodiments.

As shown in FIG. 7, the patch matching system 102 performs a quantization 702 on the final nearest neighbor field 602 to generate a compressed nearest neighbor field 704. More particularly, the patch matching system 102 merges two or more regions of the final nearest neighbor field 602 together based on a coherency comparison. For example, the patch matching system 102 analyzes the final nearest neighbor field 602 to identify regions (including one or more offsets) of the final nearest neighbor field 602 that are within a threshold coherency (or similarity) of each other. Indeed, the patch matching system 102 determines a coherency score for one region of a nearest neighbor field with respect to another region of the nearest neighbor field. To determine a coherency score, the patch matching system 102 compares offsets (or pixels indicated by offsets) of one region with those of another region to determine a distance or value difference between them.

The patch matching system 102 determines how aggressively to merge regions of the final nearest neighbor field 602 based on a compression ratio. In some embodiments, the patch matching system 102 automatically determines the compression ratio based on available storage within the database 202 and/or based on a size of the final nearest neighbor field 602. In other embodiments, the patch matching system 102 receives an indication of a compression ratio from the client device 108.

In addition, the patch matching system 102 performs an encoding to compress the final nearest neighbor field 602. In some embodiments, the patch matching system 102 performs lossless compression on the final nearest neighbor field 602. For example, the patch matching system 102 utilizes a run-length encoding ("RLE") process for lossless compression of the final nearest neighbor field 602. More specifically, the patch matching system 102 stores sequences of data that occur multiple times as a single element. For example, the patch matching system 102 stores regions the final nearest neighbor field 602 that are within a threshold coherency of each other occur as single regions of a compressed nearest neighbor field 704.

Indeed, the final nearest neighbor field 602 that the patch matching system 102 generates is often composed of coherent regions (e.g., regions with the same or similar offsets). Indeed, as described in Image Synthesis Utilizing An Active Mask, U.S. Pat. No. 9,710,898, which is incorporated by reference herein in its entirety, nearest neighbor fields are often made up of a few set of coherent regions that have the same (or similar) displacement. As a result, the patch matching system 102 can compress the nearest neighbor field according to offsets, yielding a much better compression (relative to compressing absolute values of the field).

In implementations with large coherent regions, the resultant nearest neighbor fields tend to also have multiple small coherent regions. During the quantization 702, the patch matching system 102 can merge two or more of these small coherent regions of the final nearest neighbor field 602 to further improve compression. For example, the patch matching system 102 can merge two regional clusters of a nearest neighbor field where the difference between their respective offsets is within a threshold coherency.

The value or magnitude of this threshold coherency can impact the amount of loss or fidelity relative to the original nearest neighbor field. For example, with a higher threshold coherency, the patch matching system 102 can generate a better compression for the compressed nearest neighbor field 704 but lose fidelity with respect to the final nearest neighbor field 602. By modifying the threshold coherency, the patch matching system 102 can implement a lossless (where the threshold is zero) compression or a lossy compression.

Indeed, in some embodiments, the patch matching system 102 performs lossy compression to generate the compressed nearest neighbor field 704. For example, the patch matching system 102 utilizes gain and bias to determine pixel candidates and further utilizes a photometric transformation with respect to the pixel candidates (or the corresponding regions of the final nearest neighbor field 602) to generate the compressed nearest neighbor field 704.

As illustrated in FIG. 7, the patch matching system 102 stores the compressed nearest neighbor field 704 within the database 202. Thus, the patch matching system 102 can later access the compressed nearest neighbor field 704 for use with a different digital image. Indeed, the patch matching system 102 can utilize the compressed nearest neighbor field 704 as a nearest neighbor field for a different digital image to initialize the patch match algorithm 306, as described in further detail above. For example, the patch matching system 102 can generate a final nearest neighbor field 602 and a compressed nearest neighbor field 704 for a greyscale digital image to store in the database 202. In addition, the patch matching system 102 can later access the stored compressed nearest neighbor field 704 from the database 202 for modifying a color digital image.

Figure 8:
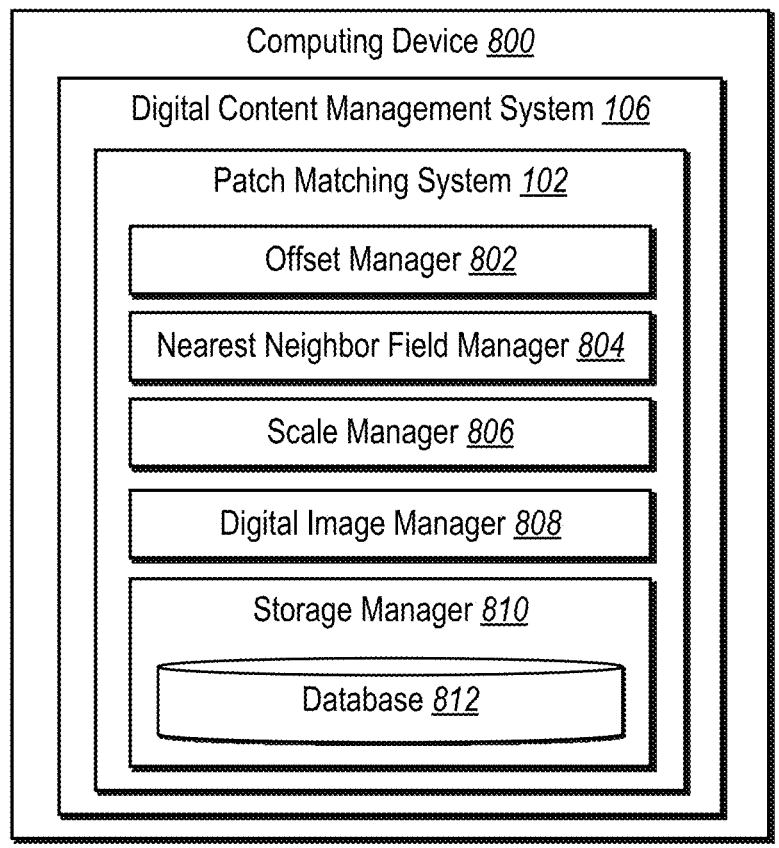
FIG. 8 illustrates a schematic diagram of a patch matching system in accordance with one or more embodiments.

Looking now to FIG. 8, additional detail will be provided regarding components and capabilities of the patch matching system 102. Specifically, FIG. 8 illustrates an example schematic diagram of the patch matching system 102 on an example computing device 800 (e.g., one or more of the client devices 108 and/or the server(s) 104). As shown in FIG. 8, the patch matching system 102 may include an offset manager 801, a nearest neighbor field manager 804, a scale manager 806, a digital image manager 808, and a storage manager 810 (which can include one or more memory devices for storing instructions for the patch matching system 102).

As just mentioned, the patch matching system 102 includes an offset manager 802. In particular, offset manager 802 manages, determines, identifies, generates, accesses, or receives offsets for pixels (or groups of pixels) of a digital image. For example, the offset manager 802 determines offsets that indicate digital image patches corresponding to a target region of a digital image. In addition, the offset manager 802 can communicate with the nearest neighbor field manager 804 to generate a nearest neighbor field for a digital image that includes one or more offsets for filling a target region of the digital image.

As mentioned, the patch matching system 102 includes a nearest neighbor field manager 804. In particular, the nearest neighbor field manager 804 manages, identifies, accesses, generates, or determines nearest neighbor fields for a digital image. In some embodiments, the nearest neighbor field 804 can communicate with the storage manager 810 to accesses a nearest neighbor field from the database 812 (e.g., the database 202). For example, the nearest neighbor field manager 804 accesses a nearest neighbor field associated with a first digital image to generate a nearest neighbor field for a second digital image. In addition, the nearest neighbor field manager 804 can compress a nearest neighbor field for storage within the database 812.

Further, the patch matching system 102 includes a scale manager 806. In particular, the scale manager 806 manages, determines, generates, or identifies scales associated with a digital image and/or a patch match algorithm (e.g., the patch match algorithm 306). Indeed, the scale manager 806 can determine a target scale for initializing the patch match algorithm based on a resolution of a nearest neighbor field associated with a first digital image. The scale manager 806 can further upscale the patch match algorithm for subsequent iterations of generating nearest neighbor fields at different resolutions.

As further shown, the patch matching system 102 includes a digital image manager 808. In particular, the digital image manager 808 can manage, access, receive, provide, generate, or otherwise obtain digital images. For example, the digital image manager 808 can generate a modified digital image such as a modified panoramic digital image based on filling a target region associated with a stitched panoramic digital image that includes missing or distorted pixels utilizing a nearest neighbor field of the stitched panoramic digital image.

In one or more embodiments, each of the components of the patch matching system 102 are in communication with one another using any suitable communication technologies. Additionally, the components of the patch matching system 102 can be in communication with one or more other devices including one or more client devices described above. It will be recognized that although the components of the patch matching system 102 are shown to be separate in FIG. 8, any of the subcomponents may be combined into fewer components, such as into a single component, or divided into more components as may serve a particular implementation. Furthermore, although the components of FIG. 8 are described in connection with the patch matching system 102, at least some of the components for performing operations in conjunction with the patch matching system 102 described herein may be implemented on other devices within the environment.

The components of the patch matching system 102 can include software, hardware, or both. For example, the components of the patch matching system 102 can include one or more instructions stored on a computer-readable storage medium and executable by processors of one or more computing devices (e.g., the computing device 800). When executed by the one or more processors, the computer-executable instructions of the patch matching system 102 can cause the computing device 800 to perform the methods described herein. Alternatively, the components of the patch matching system 102 can comprise hardware, such as a special purpose processing device to perform a certain function or group of functions. Additionally or alternatively, the components of the patch matching system 102 can include a combination of computer-executable instructions and hardware.

Furthermore, the components of the patch matching system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the patch matching system 102 may be implemented as part of a stand-alone application on a personal computing device or a mobile device. Alternatively or additionally, the components of the patch matching system 102 may be implemented in any application that allows creation and delivery of marketing content to users, including, but not limited to, applications in ADOBE CREATIVE CLOUD, such as ADOBE PHOTOSHOP, ADOBE LIGHTROOM, and ADOBE CAMERA RAW. "ADOBE," "ADOBE PHOTOSHOP," "ADOBE LIGHTROOM," and "ADOBE CAMERA RAW" are trademarks of Adobe Inc. in the United States and/or other countries.

FIGS. 1-8, the corresponding text, and the examples provide a number of different systems, methods, and non-transitory computer readable media for generating a modified version of a digital image utilizing a nearest neighbor field associated with a different digital image. In addition to the foregoing, embodiments can also be described in terms of flowcharts comprising acts for accomplishing a particular result. For example, FIG. 9 illustrates a flowchart of an example sequence of acts in accordance with one or more embodiments.

Figure 9:
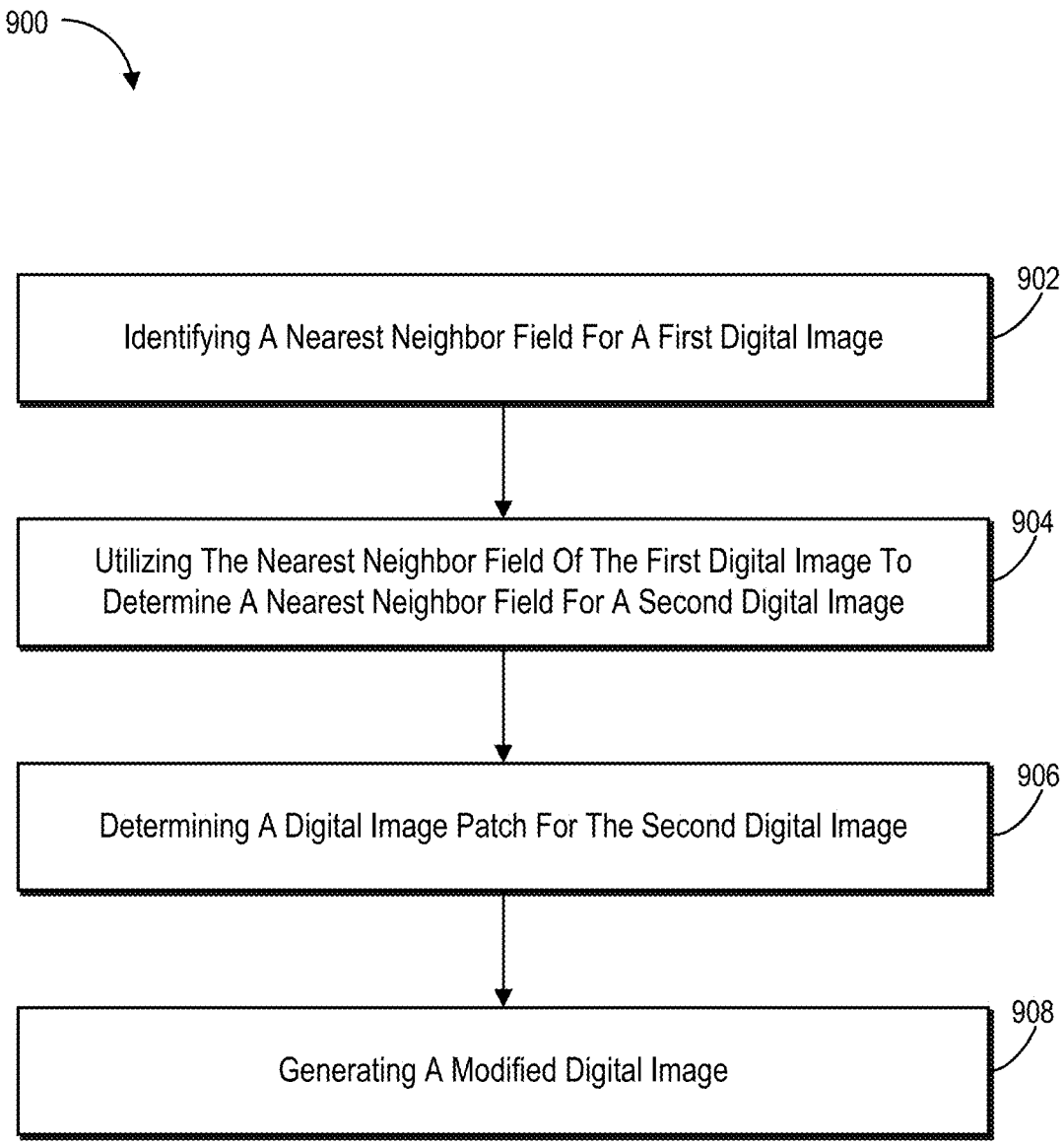
FIG. 9 illustrates a flowchart of a series of acts for generating a modified digital image based on initializing a patch match algorithm with a nearest neighbor field of a first digital image to generate nearest neighbor fields for a second digital image.

While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer readable medium can comprise instructions, that when executed by one or more processors, cause a computing device to perform the acts of FIG. 9. In still further embodiments, a system can perform the acts of FIG. 9. Additionally, the acts described herein may be repeated or performed in parallel with one another or in parallel with different instances of the same or other similar acts.

FIG. 9 illustrates an example series of acts 900 for generating a modified digital image based on initializing a patch match algorithm with a nearest neighbor field of a first digital image to generate nearest neighbor fields for a second digital image. As shown, the series of acts 900 includes an act 902 of identifying a nearest neighbor field for a first digital image. In particular, the act 904 can involve identifying a first image nearest neighbor field associated with a first digital image corresponding to a first resolution.

In addition, the series of acts 900 includes an act 904 of utilizing the nearest neighbor field of the first digital image to determine a nearest neighbor field for a second digital image. In particular, the act 904 can involve utilizing the first image nearest neighbor field associated with the first digital image to determine a second image nearest neighbor field for a second digital image corresponding to a second resolution (e.g., a resolution larger than the first resolution). In some embodiments, the act 904 can involve determining offsets that indicate pixels to match a target region associated with the second digital image. In these or other embodiments, the act 904 involves determining, based on the first resolution, a target scale within a hierarchy of scales corresponding to a patch match algorithm, utilizing the first image nearest neighbor field associated with the first digital image to determine a second image nearest neighbor field for the second digital image at the target scale, determining a subsequent-scale nearest neighbor field for the second digital image at an additional scale within the hierarchy of scales based on the second image nearest neighbor field at the target scale, and generating the digital image patch based on the second image nearest neighbor field and/or the subsequent-scale nearest neighbor field. In some embodiments, the first digital image can include a thumbnail digital image, and the second digital image can include a high-resolution digital image.

In some embodiments, determining the target scale involves comparing the first resolution of the first digital image with designated scales within the hierarchy of scales to determine a closest larger designated scale as the target scale. Additionally, selecting the digital image patch based on the second image nearest neighbor field and the subsequent-scale nearest neighbor field can include determining colors for the digital image patch by performing a voting operation based on the subsequent-scale nearest neighbor field for the second digital image. Further, the act 904 can involve determining the second image nearest neighbor field for by performing a voting operation based on the first image nearest neighbor field.

Further, the series of acts 900 includes an act 906 of determining a digital image patch for the second digital image. In particular, the act 906 can involve determining a digital image patch for the second digital image based on the second image nearest neighbor field.

As further shown in FIG. 9, the series of acts 900 includes an act 908 of generating a modified digital image. In particular, the act 908 can involve generating a modified digital image based on the digital image patch. In some embodiments, the act 908 can involve filling a target region associated with the second digital image utilizing pixels indicated by the second image nearest neighbor field. For example, the act 908 can include identifying pixels to fill a target region associated with the second digital image.

In some embodiments, the series of acts 900 can include an act of determining a target scale within a hierarchy of scales based on the first resolution of the first digital image. In addition, the series of acts 900 can include an act of determining that the first resolution does not match any scale within the hierarchy of scales. Further, the series of acts 900 can include an act of, based on determining that the first resolution does not match any scale within the hierarchy of scales, upsampling the first image nearest neighbor field to match the target scale.

In one or more embodiments, the series of acts 900 can include an act of utilizing the upsampled nearest neighbor field associated with the first digital image as the nearest neighbor field for the second digital image at the target scale. In these or other embodiments, the series of acts 900 can include an act of utilizing the nearest neighbor field associated with the first digital image to determine a nearest neighbor field for a second digital image corresponding to a second resolution larger than the first resolution by not determining nearest neighbor fields associated with smaller scales than the target scale within the hierarchy of scales.

The series of acts 900 can include an act of generating a compressed nearest neighbor field for the second digital image by merging regions of the second image nearest neighbor field for the second digital image together based on similarities between the regions. The series of acts 900 can also include an act of storing the compressed nearest neighbor field for the second digital image. In some embodiments, the series of acts 900 includes an act of initializing the patch match algorithm at the target scale to determine the second image nearest neighbor field based on the first image nearest neighbor field. In these or other embodiments, the first digital image includes a representation of a first channel associated with a digital model and the second digital image includes a representation of a second channel associated with the digital model. For example, the second digital image can have a second resolution different from (e.g., larger than or smaller than) the first resolution of the first digital image, and identifying the nearest neighbor field associated with the first digital image can include identifying a plurality of offsets that indicate pixels to match a target region of the first digital image.

Figure 10:
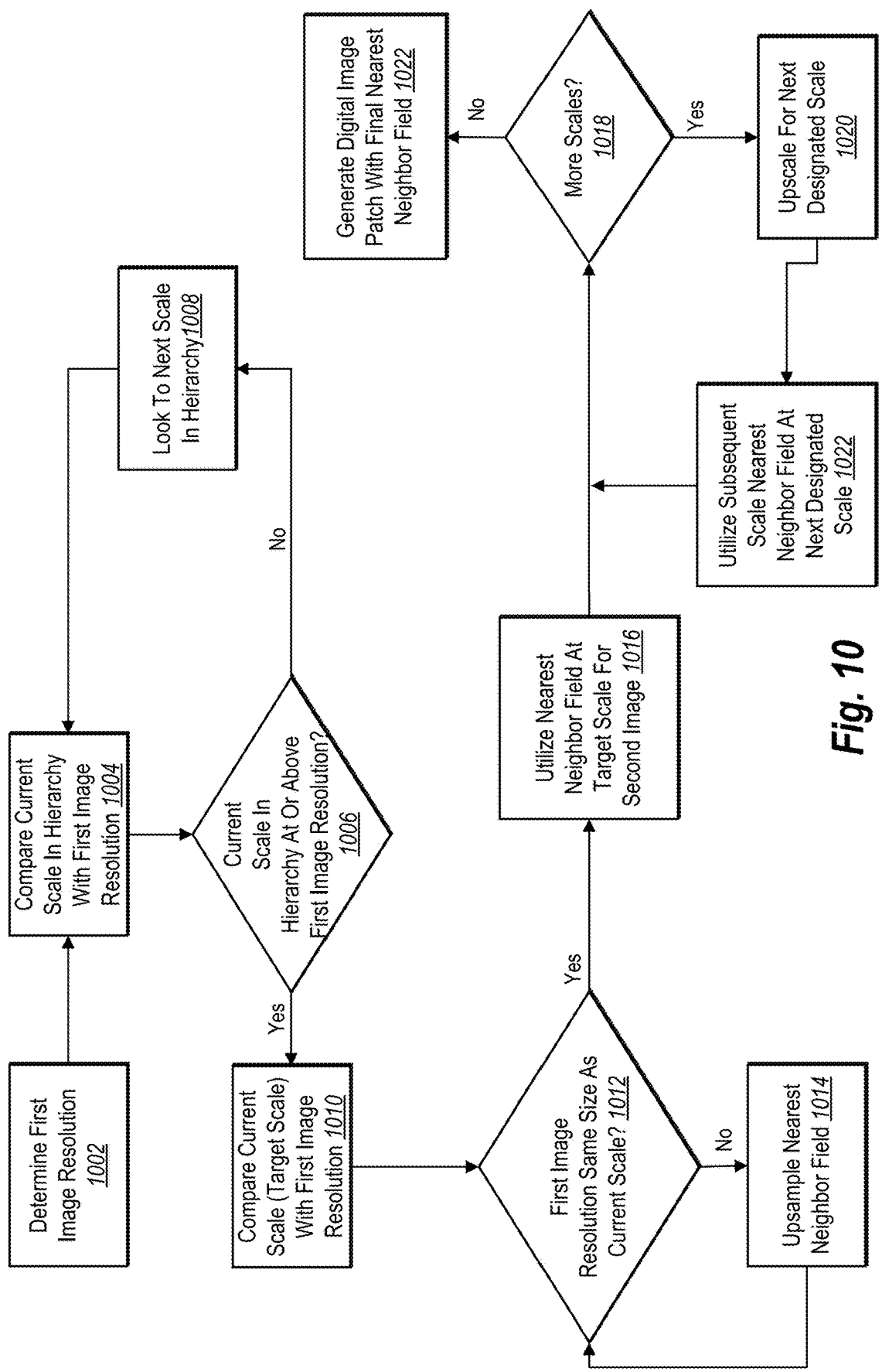
FIG. 10 illustrates a series of acts for a step for generating a digital image patch for a second digital image utilizing the nearest neighbor field of a first digital image.

In one or more embodiments, the patch matching system 102 can perform a step for generating a digital image patch for a second digital image utilizing the nearest neighbor field of the first digital image. As mentioned above, the description of FIGS. 3-5 can provide the algorithms for the step for generating a digital image patch for a second digital image utilizing the nearest neighbor field of the first digital image. Additionally, FIG. 10 illustrates various acts 1002-1022 that the patch matching system 102 can perform as part of the step for generating a digital image patch for a second digital image utilizing the nearest neighbor field of the first digital image.

For instance, the patch matching system 102 performs an act 1002 to determine a first image resolution. As described above, the patch matching system 102 determines a first image resolution of a first digital image such as a thumbnail digital image or some other smaller resolution digital image.

As shown, the patch matching system 102 also performs an act 1004 to compare a current scale (within a hierarchy of scales) with the first image resolution. In particular, the patch matching system 102 determines a current scale of the patch match algorithm 306 (e.g., a smallest scale of the patch match algorithm 306) and compares the current scale with the first image resolution determined via the act 1002. In addition, the patch matching system 102 performs an act 1006 to determine whether the current scale is at or above the first image resolution. In particular, the patch matching system 102 determines whether the current scale is equal to or larger than the first image resolution (or a scale corresponding to the first image resolution).

If the current scale is smaller than the first image resolution (i.e., not at or above the first image resolution), then the patch matching system 102 performs the act 1008 to look to the next scale of the patch match algorithm 306 (e.g., the scale one iteration larger within the hierarchy of scales). The patch matching system 102 further repeats the act 1004 to compare the new current scale with the first image resolution. The patch matching system 102 continues the process of looking to larger and larger scales until the act 1006 results in a determination that the current scale is at or above the first image resolution (e.g., the current scale is the target scale).

Upon such determination, the patch matching system 102 performs an act 1010 to compare the current scale (i.e., the target scale) with the first image resolution. For example, the patch matching system 102 performs an act 1012 to determine whether the resolution of the nearest neighbor field associated with the first image resolution matches the target scale. If the patch matching system 102 determines that the first image resolution of the nearest neighbor field does not match that of the target scale, then the patch matching system 102 performs an act 1014 to upsample the nearest neighbor field so that the upscaled nearest neighbor field matches that of the target scale.

Based on determining that the first image resolution of the nearest neighbor field matches that of the target scale, the patch matching system 102 performs an act 1016 to utilize the nearest neighbor field (either the original or upsampled nearest neighbor field depending on the act 1012) at the target scale for the digital image. In particular, as described above, the patch matching system 102 can utilize the nearest neighbor field to identify pixels to use in filling a target region with regard to the target scale.

As shown, the patch matching system 102 can also analyze other scales. For example, as further shown in FIG. 10, the patch matching system 102 performs an act 1018 to determine whether or not there are more scales within the hierarchy of scales associated with the patch match algorithm 306. If the patch matching system 102 determines that there are more scales with which to analyze the second digital image, then the patch matching system 102 performs the act 1020 to upscale to the next designated scale. Moreover, as described above, the patch matching system 102 performs an act 1022 to generate a subsequent scale nearest neighbor field at the next designated scale. This can include the expectation maximization (EM) iteration pipeline described above (e.g., in relation to FIGS. 4 and 5). The patch matching system 102 repeats the acts 1016-1020 by generating nearest neighbor fields at respective scales until there are no more scales of the patch match algorithm 306 to analyze the digital image.

Based on the nearest neighbor fields generated at the various scales, the patch matching system 102 further performs an act 1022 to generate a digital image patch with a final nearest neighbor field. Based on determining the final nearest neighbor field, the patch matching system 102 generates a digital image patch by determining pixels (or groups of pixels) identified or designated by offsets within the nearest neighbor field to fill (a portion of) a target region.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
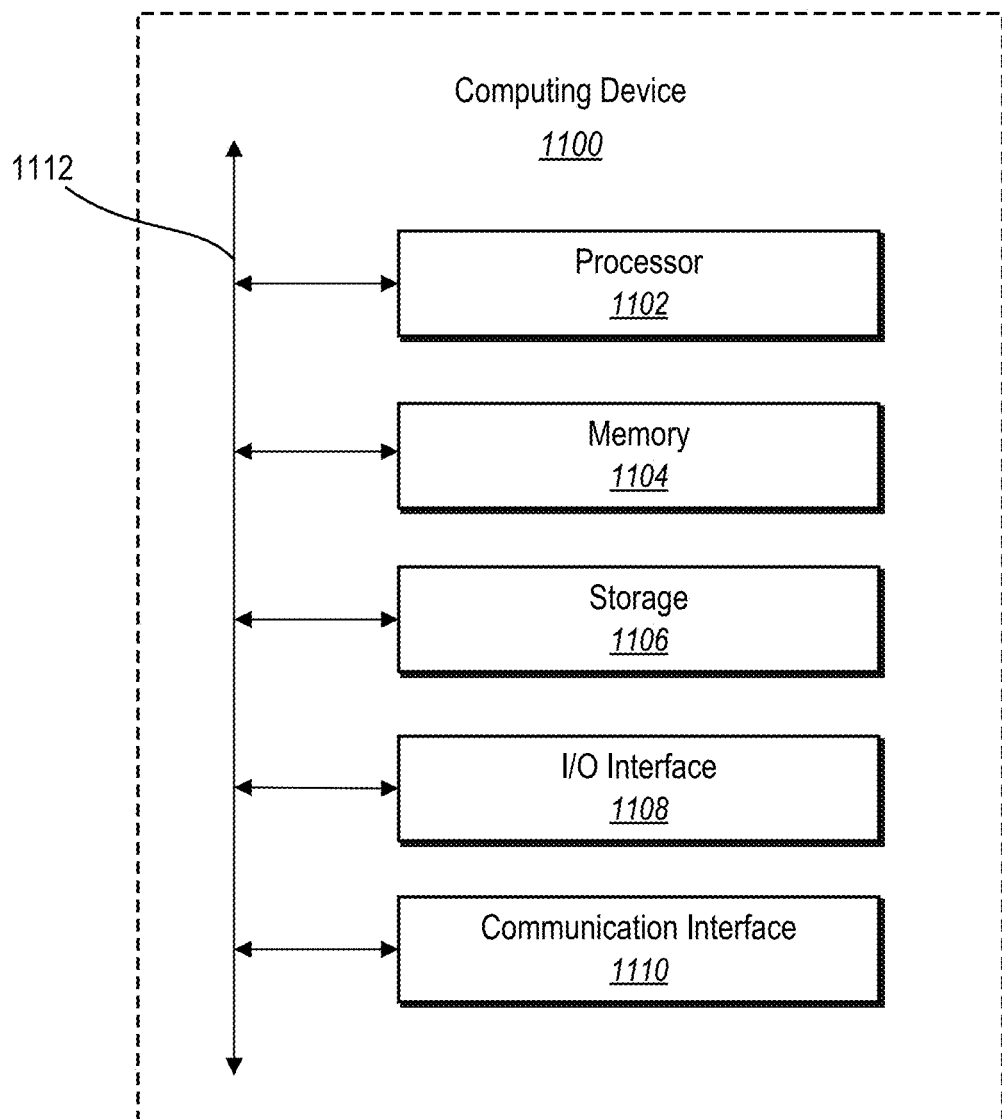
FIG. 11 illustrates a block diagram of an example computing device in accordance with one or more embodiments.

FIG. 11 illustrates, in block diagram form, an example computing device 1100 (e.g., the computing device 800, the client device 108, and/or the server(s) 104) that may be configured to perform one or more of the processes described above. One will appreciate that the patch matching system 102 can comprise implementations of the computing device 1100. As shown by FIG. 11, the computing device can comprise a processor 1102, memory 1104, a storage device 1106, an I/O interface 1108, and a communication interface 1110. Furthermore, the computing device 1100 can include an input device such as a touchscreen, mouse, keyboard, etc. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, storage device 1106 can comprise a non-transitory storage medium described above. The storage device 1106 may include a hard disk drive (HDD), flash memory, a Universal Serial Bus (USB) drive or a combination of these or other storage devices.

The computing device 1100 also includes one or more input or output ("I/O") devices/interfaces 1108, which are provided to allow a user to provide input to (such as user strokes), receive output from, and otherwise transfer data to and from the computing device 1100. These I/O devices/interfaces 1108 may include a mouse, keypad or a keyboard, a touch screen, camera, optical scanner, network interface, modem, other known I/O devices or a combination of such I/O devices/interfaces 1108. The touch screen may be activated with a writing device or a finger.

The I/O devices/interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1108 is configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices 1100 or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause a computing device to:
   perform a patch match algorithm on a digital image in a first resolution;
   determine results from the patch match algorithm on the digital image in the first resolution; and
   generate an inpainted digital image in a second resolution larger than the first resolution utilizing the patch match algorithm according to the results of the first resolution.

2. The non-transitory computer readable medium of claim 1, further comprising instructions that, when executed by the at least one processor, cause the computing device to determine the results from the patch match algorithm in the first resolution by determining a first set of pixel offsets in the first resolution.

3. The non-transitory computer readable medium of claim 2, further comprising instructions that, when executed by the at least one processor, cause the computing device to determine a second set of pixel offsets in the second resolution from the first set of pixel offsets in the first resolution.

4. The non-transitory computer readable medium of claim 3, further comprising instructions that, when executed by the at least one processor, cause the computing device to generate the inpainted digital image by filling pixels of a second digital image in the second resolution utilizing the patch match algorithm according to the second set of pixel offsets.

5. The non-transitory computer readable medium of claim 1, further comprising instructions that, when executed by the at least one processor, cause the computing device to generate the inpainted digital image by filling pixels of a panoramic digital image in the second resolution utilizing the patch match algorithm.

6. The non-transitory computer readable medium of claim 1, further comprising instructions that, when executed by the at least one processor, cause the computing device to select a target scale for the patch match algorithm from a hierarchy of scales.

7. The non-transitory computer readable medium of claim 6, further comprising instructions that, when executed by the at least one processor, cause the computing device to select the target scale by identifying a scale within the hierarchy of scales that is closest to and larger than the first resolution.

8. A system comprising:
   one or more memory devices comprising a digital image and a patch match algorithm; and
   one or more processors configured to cause the system to:

implement the patch match algorithm on a digital image in a first resolution;

determine, from implementing the patch match algorithm on the digital image, a first set of pixel offsets in the first resolution;

determine, from the first set of pixel offsets in the first resolution, a second set of pixel offsets in a second resolution larger than the first resolution; and generate an inpainted digital image in the second resolution utilizing the patch match algorithm according to the second set of pixel offsets.

9. The system of claim 8, wherein the one or more processors are further configured to cause the system to determine the first set of pixel offsets in the first resolution by determining a first nearest neighbor field associated with the digital image utilizing the patch match algorithm.

10. The system of claim 9, wherein the one or more processors are further configured to cause the system to determine the second set of pixel offsets in the second resolution by determining a second nearest neighbor field associated with a second digital image in the second resolution utilizing the patch match algorithm in the second resolution.

11. The system of claim 10, wherein the one or more processors are further configured to cause the system to determine the second set of pixel offsets in the second resolution by initializing the patch match algorithm at a target scale corresponding to the first resolution to avoid determining pixel offsets at resolutions smaller than the first resolution.

12. The system of claim 8, wherein the one or more processors are further configured to cause the system to generate the inpainted digital image by generating a panoramic digital image in the second resolution utilizing the second set of pixel offsets to stitch two or more digital images together.

13. The system of claim 12, wherein the one or more processors are further configured to cause the system to determine the first set of pixel offsets from a thumbnail version of the panoramic digital image utilizing the patch match algorithm.

14. A computer-implemented method comprising:

performing a patch match algorithm on a digital image in a first resolution;

determining results from the patch match algorithm on the digital image in the first resolution;

generating an inpainted digital image in a second resolution larger than the first resolution utilizing the patch match algorithm according to the results of the first resolution; and providing the inpainted digital image for display on a client device.

15. The computer-implemented method of claim 14, wherein determining the results from the patch match algorithm comprises determining a first nearest neighbor field defining a first set of pixel offsets in the first resolution.

16. The computer-implemented method of claim 15, wherein generating the inpainted digital image in the second resolution comprises determining, from the first nearest neighbor field, a second nearest neighbor field defining a second set of pixel offsets for inpainting in the second resolution.

17. The computer-implemented method of claim 16, wherein determining the second nearest neighbor field for inpainting in the second resolution comprises:

selecting, from a hierarchy of scales associated with the patch match algorithm, a target scale corresponding to the first resolution; and initializing the patch match algorithm at the target scale to avoid determining pixel offsets at resolutions lower than the first resolution.

18. The computer-implemented method of claim 14, wherein determining the results from the patch match algorithm comprises determining pixel offsets for filling pixels of a thumbnail version of a stitched panoramic digital image.

19. The computer-implemented method of claim 14, wherein generating the inpainted digital image comprises generating a panoramic digital image in the second resolution utilizing the results of the patch match algorithm to stitch two or more digital images together.

20. The computer-implemented method of claim 14, wherein generating the inpainted digital image comprises initializing the patch match algorithm utilizing a nearest neighbor field determined from the digital image in the first resolution.

* * * * *